United States Patent
Ochi et al.

(10) Patent No.: US 10,590,281 B2
(45) Date of Patent: Mar. 17, 2020

(54) POWDER COATING MATERIAL, COATED ARTICLE, AND METHOD FOR PRODUCING COATED ARTICLE

(71) Applicant: AGC Inc., Chiyoda-ku (JP)

(72) Inventors: Shuhei Ochi, Chiyoda-ku (JP); Masataka Aikawa, Chiyoda-ku (JP); Shun Saito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 60 days.

(21) Appl. No.: 15/670,673

(22) Filed: Aug. 7, 2017

(65) Prior Publication Data

US 2017/0335117 A1 Nov. 23, 2017

Related U.S. Application Data

(63) Continuation of application No. PCT/JP2016/055699, filed on Feb. 25, 2016.

(30) Foreign Application Priority Data

| Mar. 2, 2015 | (JP) | 2015-040533 |
| Aug. 6, 2015 | (JP) | 2015-156209 |
| Oct. 6, 2015 | (JP) | 2015-198781 |

(51) Int. Cl.

| *C09D 5/03* | (2006.01) |
| *B05D 7/24* | (2006.01) |
| *B05D 1/12* | (2006.01) |
| *C09D 127/12* | (2006.01) |
| *C09D 167/00* | (2006.01) |
| *C09D 127/18* | (2006.01) |
| *C09D 157/06* | (2006.01) |
| *C09D 163/00* | (2006.01) |
| *B05D 1/06* | (2006.01) |
| *B05D 5/06* | (2006.01) |
| *C09D 7/61* | (2018.01) |
| *C09D 127/16* | (2006.01) |

(52) U.S. Cl.
CPC ............... *C09D 5/035* (2013.01); *B05D 1/06* (2013.01); *B05D 1/12* (2013.01); *B05D 5/067* (2013.01); *B05D 7/24* (2013.01); *C09D 5/03* (2013.01); *C09D 7/61* (2018.01); *C09D 127/12* (2013.01); *C09D 127/16* (2013.01); *C09D 127/18* (2013.01); *C09D 157/06* (2013.01); *C09D 163/00* (2013.01); *C09D 167/00* (2013.01); *B05D 2202/15* (2013.01); *B05D 2601/08* (2013.01)

(58) Field of Classification Search
CPC ........ C09D 5/035; C09D 5/03; C09D 127/12; C09D 127/18; C09D 127/16; C09D 157/06; C09D 163/00; B05D 7/24; B05D 1/12; B05D 1/06; B05D 2202/15; B05D 2601/08

See application file for complete search history.

(56) References Cited

U.S. PATENT DOCUMENTS 7,244,780 B1 * 7/2007 Robinson ............... C09D 5/032
524/441

FOREIGN PATENT DOCUMENTS

| EP | 1 877 501 B1 | 11/2008 | |
| JP | 2004-514760 | 5/2004 | |
| JP | 2011-12119 | 1/2011 | |
| JP | 2013-76019 | 4/2013 | |
| JP | 2014-118458 | 6/2014 | |
| WO | WO2013/186832 | * 12/2013 | ........... C09D 201/04 |
| WO | WO2013/186832 A1 | 12/2013 | |

OTHER PUBLICATIONS

WO2013186832 english translation Dec. 2013.*
International Search Report dated May 24, 2016 in PCT/JP2016/055699, filed on Feb. 25, 2016.
John Burke, "Solubility Parameters: Theory and Application". The American Institute for Conservation, The Book and Paper Group Annual, vol. Three, 1984, Retrieved from https://cool.conservation-us.org/coolaic/sg/bpg/annual/v03/bp03-04.html.

* cited by examiner

*Primary Examiner* — Amina S Khan
(74) *Attorney, Agent, or Firm* — Oblon, McClelland, Maier & Neustadt, L.L.P.

(57) ABSTRACT

The invention provides a powder coating material capable of forming a film excellent in metallic hue, concealing property and weather resistance. The powder coating material comprises the following fluororesin (A), the following resin (B) and the following pigment (C) as constituents thereof, wherein the content of the pigment (C) is from 0.7 to 23 mass %; Fluororesin (A): a fluororesin having a fluorine content of at least 10 mass %; Resin (B): a resin having a SP value larger than that of the fluororesin (A), and the difference between the SP value thereof and the SP value of the fluororesin (A) is at least 0.4 $(J/cm^3)^{1/2}$; Pigment (C): a pigment which is a metallic pigment covered with a covering material, and the SP value of the covering material exceeds the SP value of the fluororesin (A) and less than the SP value of the resin (B).

14 Claims, 1 Drawing Sheet

POWDER COATING MATERIAL, COATED ARTICLE, AND METHOD FOR PRODUCING COATED ARTICLE

This application is a continuation of PCT Application No. PCT/JP2016/055699, filed on Feb. 25, 2016, which is based upon and claims the benefit of priority from Japanese Patent Application No. 2015-040533 filed on Mar. 2, 2015, Japanese Patent Application No. 2015-156209 filed on Aug. 6, 2015 and Japanese Patent Application No. 2015-198781 filed on Oct. 6, 2015. The contents of those applications are incorporated herein by reference in their entireties.

TECHNICAL FIELD

The present invention relates to a powder coating material, a coated article, and a method for producing a coated article.

BACKGROUND ART

In recent years, global scale environmental destruction such as global warming, ozone layer depletion, acid rain, etc. has become an international problem. There is an urgent need for global environmental pollution countermeasures, and at present, from the viewpoint of environmental protection, various emissions regulations are enforced in each country. Among them, the problem of discharge of volatile organic compounds (VOC) such as organic solvents into the atmosphere is critical, and therefore, VOC reduction is being advanced under reinforcement of VOC emission regulations.

Heretofore, an organic solvent has been used for a coating material, but in an environment where VOC reduction is promoted, recently, a powder coating material has now become to be widely used. The powder coating material contains no organic solvent and thus requires no exhaust treatment or waste water treatment at the time of coating, and further can be recovered and reused, whereby the environmental load is extremely low.

In recent years, in various fields such as architecture, automobile, etc., there is a growing demand for a coating film with a hue of metallic tone. Usually for formation of a coating film with a hue of metallic tone, a coating material containing a metallic pigment such as aluminum powder, etc. (hereinafter also referred to as a metallic coating material) is used.

However, in a case where the metallic coating material is a powder coating material, as compared with the case of solvent-type or water-type, the metallic pigment tends to be hardly aligned parallel to the substrate, and luster of the coating film tends to be low, whereby there will be such a problem that no sufficient metallic hue tends to be obtained.

To alleviate such a problem, a bonding technique to attach a metallic pigment to the surface of powder particles (also referred to as a bonded method) is said to be effective (e.g. [0009] in Patent Document 1).

On the other hand, as the powder coating material, an acrylic resin-type powder coating material, a polyester resin-type powder coating material or an epoxy resin-type powder coating material has been mainly used. However, a cured film formed by such a powder coating material is inferior in weather resistance.

With respect to such a problem, for example, a powder coating material composition having the following (1) has been proposed.

(1) A layer separation type powder coating material composition which is a powder coating material obtainable by melt-kneading a mixture comprising from 10 to 50 parts by mass of a fluororesin, from 10 to 90 parts by mass of a polyester resin and from 10 to 50 parts by mass of a pigment, followed by cooling and grinding, and of such a type that when the powder coating material is melted and cured, the fluororesin and the polyester resin will be layer-separated without being compatibilized (Patent Document 2).

By using such a layer separation type powder coating material composition, it is possible to form, in one-coating operation, a coating film of a two-layer structure comprising a polyester resin layer on the substrate side and a fluororesin layer on the air side, and as the coating film has a fluororesin layer on the air side, it is said to be superior in weather resistance.

PRIOR ART DOCUMENTS

Patent Documents

Patent Document 1: JP-A-2004-514760
Patent Document 2: JP-A-2011-12119

DISCLOSURE OF INVENTION

Technical Problems

According to studies made by the present inventors, it is not possible to sufficiently control alignment of a metallic pigment by the conventional bonding technique to form a coating film of a single-layer structure and therefore, it is difficult to obtain a coating film having a metallic hue (luster) required for a metallic coating material. In addition, from the disturbance of alignment, there is also a problem such that the concealing property is low. The concealing property may be improved if the content of metallic pigment is increased, but adhesion of the coating film to the substrate will be thereby lowered.

In Patent Document 2, as a pigment, a luster pigment is disclosed, and as a luster pigment, an aluminum powder is disclosed. However, no consideration is given to the alignment of a metallic pigment. According to studies made by the present inventors, in a case where a metallic pigment is used as a pigment in the powder coating material composition of (1), the metallic pigment tends to be hardly aligned in parallel to the substrate, whereby, as described above, the metallic hue and the concealing property tend to be insufficient.

An object of the present invention is to provide a powder coating material capable of forming a coating film excellent in metallic hue, concealing property and weather resistance, and a method for its production.

Another object of the present invention is to provide a coated article provided with a coating film excellent in metallic hue, concealing property and weather resistance, and a method for its production.

Solution to Problems

The present invention provides a powder coating material, a coated article and a method for their production, having constructions of the following [1] to [14].

[1] A powder coating material characterized by comprising, as constituents thereof, the following fluororesin (A), the following resin (B) and the following pigment (C), wherein the content of the pigment (C) to the total amount of the powder coating material is from 0.7 to 23 mass %, Fluororesin (A): a fluororesin having a fluorine content of at least 10 mass %, Resin (B): a resin having a SP value larger than that of the fluororesin (A), and the difference between the SP value thereof and the SP value of the fluororesin (A) is at least 0.4 $(J/cm^3)^{1/2}$, Pigment (C): a pigment which is a metallic pigment covered with a covering material, and the SP value of the covering material exceeds the SP value of the fluororesin (A) and less than the SP value of the resin (B).

[2]. The powder coating material according to [1], wherein the powder coating material is made of a powder comprising powder particles containing the fluororesin (A) and the resin (B) and powder particles composed of the pigment (C).

[3] The powder coating material according to [1], wherein the powder coating material is made of a powder comprising powder particles containing the fluororesin (A), powder particles containing the resin (B) and powder particles composed of the pigment (C).

[4] The powder coating material according to any one of [1] to [3], wherein the fluororesin (A) is a polyvinylidene fluoride.

[5] The powder coating material according to any one of [1] to [3], wherein the fluororesin (A) is a fluororesin having hydroxy groups or carboxy groups.

[6] The powder coating material according to [5], wherein the powder particles containing the fluororesin (A) further contain a curing agent.

[7] The powder coating material according to any one of [1] to [6], wherein the resin (B) is a fluororesin having a fluorine content of less than 10 mass %, or a resin having no fluorine atom.

[8] The powder coating material according to [7], wherein the resin (B) is a resin having reactive groups.

[9] The powder coating material according to [8], wherein the resin (B) is a polyester resin, an acrylic resin or an epoxy resin.

[10] The powder coating material according to [8] or [9], wherein the powder particles containing the resin (B) further contain a curing agent.

[11] The powder coating material according to any one of [1] to [10], wherein the covering material in the pigment (C) is made of at least one member selected from the group consisting of a resin, an aliphatic compound, an aromatic compound and a silane compound.

[12] The powder coating material according to any one of [1] to [11], wherein the pigment (C) is a metallic pigment composed of scaly aluminum particles covered with a covering material.

[13] A coated article having, on the surface of a substrate, a coating film formed from the powder coating material as defined in any one of [1] to [12].

[14] A method for producing a coated article having a coating film on the surface of a substrate, characterized by applying the powder coating material as defined in any one of [1] to [12] to a substrate to form a film of the powder, heating the film of the powder to form a film made of a melt of the powder, and cooling the film made of the melt to form a coating film.

Advantageous Effects of Invention

According to the powder coating material of the present invention, it is possible to form a coating film excellent in metallic hue, concealing property and weather resistance.

The coated article of the invention is provided with a coating film excellent in metallic hue, concealing property and weather resistance.

According to the method for producing a coated article of the present invention, it is possible to produce a coated article provided with a coating film excellent in metallic hue, concealing property and weather resistance.

DESCRIPTION OF EMBODIMENTS

Figure 1:
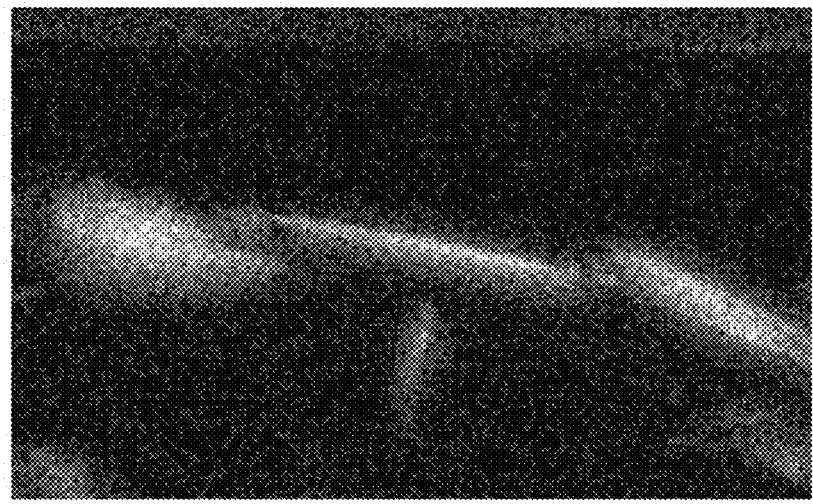
FIG. 1 is a scanning electron microscopic (SEM) image of a cross section of the coating film of the coated article obtained in Ex. 1.

Meanings of terms in the present invention are as follows.

The "SP value" means a value of solubility parameter and is a cohesive energy density, i.e. a value of the one-half power of the evaporation energy per unit volume of one molecule, which is an index showing the magnitude of the polarity per unit volume. In a case where two materials are mixed, when the difference in their SP values is small, they are mixed easily (compatibility is high), and when the difference in their SP values is large, they are hardly mixed (compatibility is low).

In the present invention, the SP value is a SP value calculated by the Fedros method (see literature: R. F. Fedros, Polym. Eng. Sci., 14 [2] 147 (1974)).

Specifically, the SP value is a value calculated by the following formula.

$$SP\ value = (\Delta H/V)^{1/2}$$

In the formula, $\Delta H$ represents the molar heat of vaporization (cal), and V represents the molar volume ($cm^3$). As $\Delta H$ and V, the sum ($\Delta H$) of the molar heat of vaporization and the sum (V) of the molar volume, of atomic groups described in the above literature, are used.

The "number average molecular weight" and "mass average molecular weight" of a resin are values obtained as calculated as polystyrene by a gel permeation chromatography (GPC) method.

The "melting point" of a resin is a temperature at the melting peak measured by a differential scanning calorimetry (DSC) method.

The "glass transition temperature" of a resin is the middle point glass transition temperature measured by a differential scanning calorimetry (DSC) method.

In this specification, particles to constitute a powder are referred to as "powder particles". A powder coating material is a collection of "powder particles".

In this specification, a "reactive group" of a resin means a functional group which reacts with e.g. a curing agent to induce crosslinking between molecules.

In this specification, "dry blending" means mixing at least two types of powders without melting the powders and without addition of a solvent.

A "molten film" means a film composed of a melt of a powder coating material.

The "one-coating" means conducting coating only once.

A "(meth)acrylate" is a general term for an acrylate and a methacrylate, and "(meth)acryl" is a generic term for "acryl" and "methacryl".

A "unit" refers to a moiety derived from a monomer to be present in a polymer to constitute the polymer. In the following, in some cases, unit(s) derived from an individual monomer will be referred to by the name having "unit(s)" attached to the monomer name.

[Powder Coating Material]

The powder coating material of the present invention is made of a powder which is a collection of at least one type of powder particles. Further, it is characterized by comprising a fluororesin (A), a resin (B) and a pigment (C), as components constituting the entire powder coating material regardless of constituents of the individual powder particles, and the content of the pigment (C) to the total amount of the powder coating material is from 0.7 to 23 mass %.

The powder coating material of the present invention may contain components (hereinafter also referred to as "additives") other than the fluororesin (A), the resin (B) and the pigment (C), as components to constitute the entire powder coating material. The additives may, for example, be a curing agent, a curing catalyst, a pigment other than the pigment (C) (hereinafter also referred to as "another pigment"), resin additives other than these, etc.

The powder particles to constitute the powder coating material may, for example, be powder particles containing the fluororesin (A), powder particles containing the resin (B), powder particles containing the fluororesin (A) and the resin (B), powder particles containing the fluororesin (A), the resin (B) and the pigment (C), powder particles composed of the pigment (C), powder particles composed of additives, etc. The powder coating material of the present invention is a collection of powder particles comprising at least one type of these powder particles, and it comprises, as constituents of the entire collection, the fluororesin (A), the resin (B) and the pigment (C) and may optionally further contain additives.

The powder particles containing the fluororesin (A), the powder particles containing the resin (B), the powder particles containing the fluorine resin (A) and the resin (B), and the powder particles containing the fluororesin (A), the resin (B) and the pigment (C), respectively, may contain an additive. Also, the powder particles containing the fluororesin (A), the powder particles containing the resin (B), and the powder particles containing the fluororesin (A) and the resin (B), respectively, may contain the pigment (C).

Hereinafter, in order to distinguish from the powder particles containing the fluororesin (A) and the resin (B), the powder particles containing the fluororesin (A) shall not contain the resin (B), and the powder particles containing the resin (B) shall not contain the resin (A). Further, for example, the powder particles containing the fluororesin (A), the resin (B) and the pigment (C), shall be regarded, even if they are powder particles different in the constituting proportions of these three essential components or in the presence or absence of additives, to be the same type of powder particles. Similarly, the powder particles containing the fluororesin (A) and the resin (B), shall be regarded, even if they are powder particles different in the constituting proportions of these two essential components or in the presence or absence of additives, to be the same type of powder particles. Also, the powder particles containing the fluororesin (A) or the powder particles containing the resin (B) shall be regarded, even if different in the presence or absence of additives, or in the content proportions thereof, to be the same type of powder particles. Even the powder particles composed of the pigment (C) shall also be regarded, even if the pigment (C) is different in the material or in the covering material, to be the same type of powder particles.

The powder coating material of the present invention may be composed of one type of powder particles, or may be composed of at least two types of powder particles. In a case where it is composed of one type of powder particles, the powder particles are powder particles containing the fluororesin (A), the resin (B) and the pigment (C).

The powder coating material of the present invention is preferably a powder mixture comprising powder particles composed of the pigment (C) and at least one type of powder particles containing the fluororesin (A) and the resin (B). Without using the powder particles containing the pigment (C) and the resins, by separating them into powder particles composed of the pigment (C) and powder particles containing the resins, the pigment (C) in a coating film to be formed from the powder coating material, tends to be easily aligned.

The powder coating material of the present invention is preferably a powder mixture comprising a collection of powder particles containing the fluororesin (A) (hereinafter referred to as "powder (A)"), a collection of powder particles containing the resin (B) (hereinafter referred to as "powder (B)") and a collection of powder particles composed of the pigment (C) (hereinafter referred to as "powder (C)"), or a powder mixture comprising a collection of powder particles of the fluororesin (A) and the resin (B) (hereafter referred to as "powder (AB)") and the powder (C).

As the SP values of the fluororesin (A) and the resin (B) are different, the coating film to be formed from the powder coating material tends to be easily layer separated into a layer containing the fluororesin (A) or its cured product (hereinafter also referred to as the "layer (A)") and a layer containing the resin (B) or its cured product (hereinafter also referred to as the "layer (B)"), and when the layer separation occurs, the layer (B) will be disposed on the substrate side, and the layer (A) will be disposed on the air side. By this layer separation, the layer (A) with high surface physical properties such as weather resistance will be arranged on the air side, and the layer (B) with a good physical property such as adhesion to the substrate surface, will be arranged on the substrate side, whereby a coating film will be obtained wherein the physical properties as a whole are good as compared with a coating film having no phase separation occurred.

As the powder coating material of the present invention, particularly preferred is a powder mixture comprising the powder (A), the powder (B) and the powder (C). By adjusting the SP value of the pigment (C) to be a value between the SP value of the fluororesin (A) and the SP value of the resin (B), at the time when the coating film to be formed from the powder coating material will be layer-separated into a layer (A) and a layer (B), it becomes easy to let the pigment (C) be localized at the interface of the two layers or its vicinity. Further, the surface of the scaly particles of pigment (C) tends to be aligned in parallel along the interface. A layer containing the pigment (C) will be hereinafter also referred to as "layer (C)". The layer (C) is a layer containing the pigment (C) as well as the fluororesin (A), the resin (B), cured products thereof, etc. acting as the binder for the pigment.

The powder particles to constitute the powder (A) contain a fluororesin (A), and may further contain at least one type of additives, as the case requires. In a case where the fluororesin (A) is a fluororesin (A) having reactive groups, the powder particles preferably contain a curing agent or a curing catalyst to cure the fluororesin (A).

The powder particles to constitute the powder (B) contain the resin (B), and may further contain at least one type of additives, as the case requires. In a case where the resin (B) is a resin (B) having reactive groups, the powder particles preferably contain a curing agent and a curing catalyst to cure the resin (B).

The powder particles to constitute the powder (AB) contain the fluororesin (A) and the resin (B), and may further contain at least one type of additives, as the case requires. In a case where at least one of the fluororesin (A) and the resin (B) has reactive groups, the powder particles preferably contain a curing agent or a curing catalyst to cure the resin. Further, in a case where the fluororesin (A) and the resin (B) are resins having the same type of reactive groups, it is possible to cure such two types of resins by using one type of a curing agent or a curing catalyst. In a case where both the fluororesin (A) and the resin (B) are resins having reactive groups, and the reactive groups are curable by different curing reactions, it is preferred to use at least two types of curing agents or curing catalysts capable of curing the two types of the resins, respectively.

<Fluororesin (A)>

The fluororesin (A) may be a homopolymer or copolymer of a fluoroolefin. The copolymer may be a copolymer of a fluoroolefin with a fluorinated monomer other than a fluoroolefin, and/or with a monomer having no fluorine atom.

The fluoroolefin is preferably at least one member selected from the group consisting of tetrafluoroethylene (hereinafter also referred to as "TFE"), chlorotrifluoroethylene (hereinafter also referred to as "CTFE"), hexafluoropropylene, vinylidene fluoride and vinyl fluoride, particularly preferably TFE and/or CTFE. When the fluoroolefin has chlorine atom(s), it is possible to design the glass transition temperature of the fluororesin (A) to be at least 50° C., and to suppress blocking of the coating film. Further, it becomes easy to disperse other pigments (particularly colored organic pigments such as cyanine blue, cyanine green, etc.) that may be added to the fluororesin (A), as the case requires.

As the fluoroolefin, one type may be used alone, or two or more types may be used in combination.

Fluoroolefin units in the fluororesin (A) are preferably units directly formed by polymerization of a fluoroolefin.

The proportion of fluoroolefin units in the fluororesin (A) is preferably at least 5 mol %, more preferably at least 10 mol %, particularly preferably at least 20 mol %, in all units (100 mol %) in the fluororesin (A). When the proportion of fluoroolefin units is at least the above lower limit value, weather resistance of the coating film will be further excellent.

The upper limit of the proportion of fluoroolefin units is not particularly limited, and may be 100 mol %. From such a viewpoint that the fluororesin (A) tends to be non-crystalline, i.e. the fluororesin (A) is less likely to become crystalline, so that it becomes easy to form a coating film with good-adhesion property and having a uniform and smooth surface, and a high temperature will not be required at the time of baking the coating material, the upper limit is preferably at most 90 mol %, more preferably at most 80 mol %, particularly preferably at most 70 mol %.

The fluorinated monomer other than a fluoroolefin may, for example, be a polyfluoro(alkyl vinyl ether). The polyfluoro(alkyl vinyl ether) may be a perfluoro(alkyl vinyl ether). The fluorinated monomer may have a reactive group.

The monomer having no fluorine atom may, for example, be a monomer having a reactive group, or a monomer having no fluorine atom and no reactive group. The monomer having no fluorine atom and no reactive group may, for example, be an olefin, or a vinyl ether having no reactive group.

The fluororesin (A) may be a fluororesin having reactive groups, or a fluororesin having no reactive group. The fluororesin having no reactive group may, for example, be polyvinylidene fluoride (hereinafter also referred to as "PVDF"), etc.

The fluororesin having no reactive group may further have other monomer units, as the case requires, in a range not to impair the essential properties thereof. Other monomers are monomers other than a monomer (e.g. vinylidene fluoride in PVDF) to form units essential as units to constitute the fluororesin.

As the fluororesin having no reactive group, from such a viewpoint that the fluororesin (A) layer in the coating film will be excellent in flexibility and impact resistance, PVDF is preferred. The number average molecular weight of PVDF is preferably 5,000 to 1,000,000.

In the case of using PVDF as the fluororesin (A), from the viewpoint of excellent adhesion between the layer (A) and the layer (B) in the coating film, the layer (B) preferably contains an acrylic resin or a curing acrylic resin. That is, it is preferred to contain an acrylic resin as the resin (B) as a powder coating material component.

As the fluororesin (A) in the present invention, a fluororesin having reactive groups is also preferred from such a viewpoint that the coating film will thereby be excellent in antifouling property, water resistance, acid resistance and alkali resistance.

As the reactive groups, hydroxy groups, carboxy groups, and amino groups are preferred. Among them, hydroxy groups and carboxy group are particularly preferred, since the curing rate will be excellent in a case where an isocyanate-type curing agent (especially a blocked isocyanate-type curing agent) is used as the curing agent as will be described later.

As the fluororesin (A) having reactive groups, a fluororesin made of a fluorinated polymer having hydroxy groups (hereinafter also referred to as "fluorinated polymer (A1)" or a fluororesin made of a fluorinated polymer having carboxy groups (hereinafter also referred to as "fluorinated polymer (A2)") is preferred. Such a fluororesin (A) contains hydroxy groups or a carboxy groups, whereby it is excellent in curing rate in a case where the powder coating material contains, as a curing agent, an isocyanate-type curing agent (especially a blocked isocyanate-type curing agent) as will be described later. Further, it will make it easy to disperse other pigments, etc. that may be added as the case requires, and to obtain a coating film with a high gloss (60 degree gloss being at least 60%).

As the fluororesin (A) having reactive groups, a fluororesin made of the fluorinated polymer (A1) is particularly preferred.

(Fluorinated Polymer (A1))

The fluorinated polymer (A1) is preferably a fluorinated polymer comprising fluoroolefin units, units derived from a monomer having a hydroxy group (hereinafter referred to as "monomer (m1)") copolymerizable with the fluoroolefin, and, as the case requires, units derived from a monomer (hereinafter referred to as "monomer (m2)") other than the fluoroolefin and monomer (m1).

The fluorinated polymer (A1) may be a fluorinated polymer having hydroxy groups introduced by a reactive group conversion of a polymer. As such a fluorinated polymer, preferred is a fluorinated polymer obtainable by reacting a fluorinated polymer having fluoroolefin units, units of a monomer having a reactive functional group other than a hydroxy group, and, as the case requires, the above monomer (m2), with a compound having a hydroxy group and a second reactive functional group reactive with the above reactive functional group.

The fluoroolefin may be the same as mentioned above.

The monomer (such as the monomer (m1) or monomer (m2)) to be copolymerized with the fluoroolefin, may be a monomer having a fluorine atom other than a fluoroolefin, but a monomer having no fluorine atom is preferred.

The monomer (m1) is a monomer having a hydroxy group.

The monomer (m1) may, for example, be allyl alcohol, a hydroxyalkyl vinyl ether (2-hydroxyethyl vinyl ether, 4-hydroxybutyl vinyl ether, cyclohexanediol monovinyl ether, etc.), a hydroxyalkyl allyl ether (2-hydroxyethyl allyl ether, etc.), a hydroxy vinyl alkanoate (hydroxyl vinyl propionate, etc.), a hydroxyalkyl (meth)acrylate (hydroxyethyl (meth) acrylate, etc.), etc.

As the monomer (m1), one type may be used alone, or two or more types may be used in combination.

As the monomer (m2), a vinyl monomer, i.e. a compound having a carbon-carbon double bond, is preferred. The vinyl monomer is excellent in alternating copolymerization with the fluoroolefin, whereby the polymerization yield can be increased. Further, even when remained to be unreacted, it present a less impact on the coating film and can be easily removed in the production process.

The vinyl monomer may, for example, be a vinyl ether, an allyl ether, a vinyl carboxylate, an allyl carboxylate, an olefin, an unsaturated carboxylic acid ester, having no reactive group.

The vinyl ether may, for example, be a cycloalkyl vinyl ether (cyclohexyl vinyl ether (hereinafter also referred to as "CHVE"), etc.), or an alkyl vinyl ether (nonyl vinyl ether, 2-ethylhexyl vinyl ether, hexyl vinyl ether, ethyl vinyl ether, n-butyl vinyl ether, tert-butyl vinyl ether, etc.).

The allyl ether may, for example, be an alkyl allyl ether (ethyl allyl ether, hexyl allyl ether, etc.).

The vinyl carboxylate may, for example, be a vinyl ester of a carboxylic acid (acetic acid, butyric acid, pivalic acid, benzoic acid, propionic acid, etc.). Further, as a vinyl ester of a carboxylic acid having a branched alkyl group, commercially available VeoVa-9 or VeoVa-10 (trade name, manufactured by Shell Chemical) may be used.

The allyl carboxylate may, for example, be an allyl ester of a carboxylic acid (acetic acid, butyric acid, pivalic acid, benzoic acid, propionic acid, etc.).

The olefin may, for example, be ethylene, propylene, isobutylene, etc.

The unsaturated carboxylic acid ester may, for example, be methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-amyl (meth)acrylate, isoamyl (meth)acrylate, n-hexyl (meth)acrylate, isohexyl (meth)acrylate, 2-ethylhexyl (meth)acrylate, lauryl (meth)acrylate, etc.

As the monomer (m2), from such a viewpoint that it is possible to design the glass transition temperature of the hydroxy group-containing fluorinated polymer the (A1) to be at least 50° C., and to suppress blocking of the coating film, a cycloalkyl vinyl ether is preferred, and CHVE is particularly preferred.

As the monomer (m2), from the viewpoint of excellent flexibility of the coating film, one having a straight-chain or branched alkyl group having at least 3 carbon atoms is preferred.

As the monomer (m2), one type may be used alone, or two or more types may be used in combination.

As the combination of monomers to constitute a fluorinated polymer (A1), from the viewpoint of weather resistance, adhesion, flexibility and blocking resistance, preferred is the following combination (1), and particularly preferred is the following combination (2) or (3).

Combination (1)
Fluoroolefin: TFE or CTFE,
Monomer (m1): a hydroxyalkyl vinyl ether,
Monomer (m2): at least one member selected from a cycloalkyl vinyl ether, an alkyl vinyl ether and a carboxylic acid vinyl ester.

Combination (2)
Fluoroolefin: TFE,
Monomer (m1): a hydroxyalkyl vinyl ether,
Monomer (m2): CHVE or tert-butyl vinyl ether.

Combination (3)
Fluoroolefin: CTFE,
Monomer (m1): a hydroxyalkyl vinyl ether,
Monomer (m2): CHVE or tert-butyl vinyl ether.

The hydroxy value of the fluorinated polymer (A1) is preferably from 5 to 100 mgKOH/g, more preferably from 10 to 80 mgKOH/g. When the hydroxy value of the fluorinated polymer (A1) is at least the above lower limit value, adhesion between the layer (A) and the layer (B) in the coating film will be excellent. When the hydroxy value of the fluorinated polymer (A1) is at most the above upper limit value, crack resistance of the coating film will be excellent under temperature cycles between a high temperature of at least 100° C. and a low temperature of at most 10° C.

Measurement of the hydroxy value is conducted in accordance with JIS K1557-1:2007 (ISO 14900: 2001).

(Fluorinated polymer (A2))

The fluorinated polymer (A2) may, for example, be a copolymer of a fluoroolefin with a monomer having a carboxy group, or a fluorinated polymer obtainable by converting reactive groups of a fluorinated polymer having the reactive groups other than carboxy groups to carboxy group-containing groups.

The monomer having a carboxy group in the copolymer of a fluoroolefin with a monomer having a carboxy group may, for example, be (meth)acrylic acid, a carboxyalkyl vinyl ether, a carboxyalkyl allyl ether, undecylenic acid, etc. Further, the copolymer of the fluoroolefin with a monomer having a carboxy group, may contain monomer units other than these monomer units. As such monomer units, units derived from the above monomer (m1) or units derived from the above monomer (m2) may be mentioned.

In the case of the fluorinated polymer obtainable by converting reactive groups of the above mentioned fluorinated polymer having the reactive groups, to carboxy group-containing groups, as the fluorinated polymer having the reactive groups, preferred is a fluorinated polymer having hydroxy groups, and particularly preferred is the above mentioned fluorinated polymer (A1). The method of converting hydroxy groups of the fluorinated polymer to carboxy group-containing groups may, for example, be a method of reacting a polycarboxylic acid anhydride, or a method of reacting a compound having a group (which may be a carboxy group) reactive with a hydroxy group, and a carboxy group, and particularly preferred is a method of reacting a polycarboxylic acid anhydride.

The fluorinated polymer (A2) is preferably a carboxy group-containing fluorinated polymer obtainable by a method of reacting the above fluorinated polymer (A1) with a polycarboxylic acid anhydride. As the method of reacting a polycarboxylic acid anhydride to the fluoropolymer (A1), for example, the following methods may be mentioned.

Method (1): a method of reacting hydroxy groups of the fluorinated polymer (A1) with a polycarboxylic acid anhydride in an organic solvent, to form ester bonds and carboxy groups.

Method (2): a method of melt-kneading the fluorinated polymer (A1) and a polycarboxylic acid anhydride to let hydroxy groups of the fluorinated polymer (A1) be reacted with the acid anhydride to form ester bonds and carboxy groups.

The fluorinated polymer (A2) obtainable by the above methods may have unreacted hydroxy groups derived from the fluorinated polymer (A1). Here, the fluorinated polymer (A2) obtainable by the above methods will be handled, even if unreacted raw materials (fluorinated polymer (A1), an acid anhydride, etc.) are contained therein, as the fluorinated polymer (A2) of the present invention.

The polycarboxylic acid anhydride is, from the viewpoint of excellent reactivity with the fluorinated polymer (A1), preferably a dicarboxylic acid anhydride having a molecular weight of from 90 to 200. From the viewpoint of excellent reactivity with the fluorinated polymer (A1), a $C_{4-15}$ dicarboxylic acid anhydride is preferred. From the viewpoint of excellent reactivity with the fluorinated polymer (A1), a compound having a melting point of from 20 to 180° C. is preferred.

The dicarboxylic acid anhydride may, for example, be succinic anhydride (molecular weight: 100.1, melting point: 120° C., number of carbon atoms: 4), glutaric anhydride (molecular weight: 114.1, melting point: 52° C., number of carbon atoms: 5), itaconic anhydride (molecular weight: 112.1, melting point: 67° C., number of carbon atoms: 5), anhydrous 1,2-cyclohexanedicarboxylic acid (hexahydrophthalic anhydride) (molecular weight: 154.0, melting point: 35° C., number of carbon atoms: 8), anhydrous cis-4-cyclohexene-1,2-dicarboxylic acid (molecular weight: 152.0, melting point: 66° C., number of carbon atoms: 8), phthalic anhydride (molecular weight: 148.1, melting point: 131° C., number of carbon atoms : 8), 4-methylhexahydrophthalic anhydride (molecular weight: 168.0, melting point: 22° C., number of carbon atoms: 9), 1,8-naphthalic anhydride (molecular weight: 198.2, melting point: 17° C., number of carbon atoms: 11), maleic anhydride (molecular weight: 98.1, melting point: 52.6° C., number of carbon atoms: 4), 5-norbornene-2,3-dicarboxylic acid anhydride (molecular weight: 164.2, melting point: 165 to167° C., number of carbon atoms : 9), etc.

As the dicarboxylic acid anhydride, from the viewpoint of solubility and reactivity with hydroxy groups, succinic anhydride is preferred.

The proportion of fluoroolefin units in the fluororesin (A) having reactive groups, is preferably from 10 to 90 mol %, more preferably from 30 to 70 mol % and particularly preferably from 40 to 60 mol %, in all units (100 mol %) in the fluororesin (A). When the proportion of fluoroolefin units is at least the above lower limit value, weather resistance of the coating film will be further excellent. When the proportion of fluoroolefin units is at most 90 mol %, the fluororesin (A) tends to be non-crystalline, and it is possible to form a coating film excellent in adhesion and smoothness.

The proportion of units having no fluorine atom and having reactive groups in the fluororesin (A), is preferably from 0.5 to 20 mol %, particularly preferably from 1 to 15 mol %, in all units (100 mol %) in the fluororesin (A). When the proportion is at least the above lower limit value, adhesion with the layer of the resin (B) in the coating film will be excellent. When the proportion is at most the above upper limit value, scratch resistance of the coating film will be excellent.

The proportion of units having no fluorine atom or no reactive group in the fluororesin (A) having reactive groups, is preferably from 9.5 to 70 mol %, more preferably from 20 to 60 mol %, particularly preferably from 30 to 50 mol %, in all units (100 mol %) in the fluororesin (A). When the proportion is at least the above lower limit value, the glass transition temperature of the fluororesin (A) will be proper, and it will be easy to produce the powder coating material. When the proportion is at most the above upper limit value, adhesion with the layer of the resin (B) in the coating film will be excellent.

The number average molecular weight of the fluororesin (A) having reactive groups, is preferably from 3,000 to 50,000, more preferably from 5,000 to 30,000. When the number average molecular weight of the fluororesin (A) is at least the above lower limit value, the coating film will be excellent in water resistance and salt water resistance. When the number average molecular weight of the fluororesin (A) is at most the above upper limit value, the coating film will be excellent in surface smoothness.

The melting point of the fluororesin (A) in the present invention is preferably at most 300° C., more preferably at most 200° C., particularly preferably at most 180° C. When the melting point of the fluororesin (A) is at most the above upper limit value, the coating film will be excellent in surface smoothness. The melting point of the fluororesin (A) is preferably at least 60° C., more preferably at least 70° C., and further preferably at least 80° C.

The glass transition temperature of the fluororesin (A) in the invention is preferably from 40 to 150° C., more preferably from 45 to 120° C., particularly preferably from 50 to 100° C. When the glass transition temperature of the fluororesin (A) is at least the above lower limit value, it will be easy to produce a powder coating material. When the glass transition temperature of the fluororesin (A) is at most the above upper limit value, the coating film will be excellent in surface smoothness.

(Fluorine Content)

The fluorine content of the fluororesin (A) is at least 10 mass %, preferably at least 15 mass %, more preferably at least 20 mass %, further preferably at least 25 mass %. Further, the fluorine content is preferably at most 80 mass %, more preferably at most 70 mass %. When the fluorine content of the fluororesin (A) is at least the above lower limit value, the weather resistance of the coating film will be excellent. When the fluorine content of the fluororesin (A) is at most the above upper limit value, the skin smoothness of the coating film will be excellent.

Accordingly, the fluorine content of the fluororesin (A) is preferably from 10 to 80 mass %, more preferably from 15 to 80 mass %, further preferably from 20 to 70 mass %, particularly preferably from 30 to 70 mass %.

The fluorine content is usually related to the proportion of fluoroolefin units. However, after once producing a fluororesin, it is also possible to increase or decrease the fluorine content by a polymer reaction.

The fluorine content in the fluororesin (A) can be measured by a nuclear magnetic resonance (NMR) analysis.

(SP Value of Fluororesin)

The SP value of the fluororesin (A) is preferably from 16.0 to 20.0 $(J/cm^3)^{1/2}$, more preferably from 16.5 to 19.5 $(J/cm^3)^{1/2}$, particularly preferably from 17.0 to 19.0 $(J/cm^3)^{1/2}$.

As the fluororesin (A), it is possible to use any fluororesin so long as it can be used as powder coating material. Specifically, Lumiflon 710, 710F (trade name, manufactured by Asahi Glass Co., Ltd.), ZEFFLE (trade name, manufactured by Daikin Industries, Ltd.), Kynar (trade name, manufactured by Arkema), ZB-F1000 (trade name, manufactured by Dalian Zebon Co., Ltd.), Etafuron (trade name, manufactured by Eternal Corp.), or DS203 (trade name, manufactured by Dongyue Shenzhou Corp.), may be mentioned.

<Resin (B)>

The resin (B) is a resin with a SP value larger than the fluororesin (A).

The difference between the SP value of the fluororesin (A) (hereinafter also referred to as "SP value (A)") and the SP value of the resin (B) (hereafter also referred to as "SP value (B)") i.e. (SP value (B)−SP value (A)), is at least 0.4 $(J/cm^3)^{1/2}$, preferably from 0.4 to 16 $(J/cm^3)^{1/2}$, more preferably from 0.8 to 14 $(J/cm^3)^{1/2}$, further preferably from 1.0 to 14 $(J/cm^3)^{1/2}$, particularly preferably from 1.2 to 12 $(J/cm^3)^{1/2}$, most preferably from 2.0 to 12 $(J/cm^3)^{1/2}$.

When the difference in SP value is at least the above lower limit value, in the case of forming a molten film on a substrate, the molten fluororesin resin (A) and the molten resin (B) are likely to undergo layer separation. By this layer separation, on the substrate side, a layer of the resin (B) will be disposed, and on the air side, a layer of the fluororesin (A) will be disposed. Further, the pigment (C) tends to be localized at the interface of these layers, and scaly particles of the pigment (C) are likely to be aligned parallel to the substrate. Therefore, in one coating, it is possible to easily form a coating film of three layer structure wherein from the substrate side, the layer (B), the layer (C) and the layer (A) are laminated in this order.

When the difference in SP value is at most the above upper limit value, adhesion between the layer (A) and the layer (B) in the coating film will be excellent.

The SP value of the resin (B) is preferably from 18.0 to 30.0 $(J/cm^3)^{1/2}$, more preferably from 18.5 to 29.5 $(J/cm^3)^{1/2}$, particularly preferably from 19.0 to 29.0 $(J/cm^3)^{1/2}$.

In a case where the fluororesin (A) contains at least two types of fluororesins, the above mentioned difference (SP value (B)−SP value (A)) shall be obtained by adopting the largest SP value among the SP values of at least two types of fluororesins, as the SP value (A).

In a case where the resin (B) contains at least two types of resins, the difference between each of the SP values of at least two types of resins and the SP value (A) is at least 0.4 $(J/cm^3)^{1/2}$.

The resin (B) may, for example, be a non-fluororesin or a fluororesin having a fluorine content of less than 10 mass %. As the difference in the fluorine content between the fluororesin (A) and the resin (B) is large, the difference in SP value between them tends to increase. Therefore, the resin (B) is preferably a non-fluororesin or a fluororesin having a fluorine content of at most 5 mass %, particularly preferably a non-fluororesin.

The fluororesin as a resin (B) may be the same as the fluororesin (A) except that the fluorine content is less than 10 mass %, and may suitably be selected from known fluororesins depending upon the difference in the SP value from the fluororesin (A).

The non-fluororesin may, for example, be a polyester resin, an acrylic resin, an epoxy resin or an urethane resin. From the viewpoint of efficiency for melting of the powder coating material and for layer separation without being compatible with the fluororesin (A) in the curing process, at least one member selected from the group consisting of a polyester resin, an acrylic resin and an epoxy resin is preferred. Among them, in view of excellent adhesion to a substrate and from such a viewpoint that the fluororesin (A) is less likely to be included in the layer formed by the non-fluororesin, a polyester resin or an acrylic resin is preferred, and a polyester resin is particularly preferred.

In a case where PVDF is used as a fluorine resin (A), from the viewpoint of excellent adhesion between the layer (A) and the layer (B) in the coating film, it is preferred to include an acrylic resin as the non-fluororesin.

(Polyester Resin)

A polyester resin is a polymer having polycarboxylic acid units and polyhydric alcohol units, and the polycarboxylic acid units and the polyhydric alcohol units are connected by ester bonds. The polyester resin may, as the case requires, have units (e.g. hydroxy monocarboxylic acid units, etc.) other than these two units. The polyester resin has at least either a carboxy group or a hydroxy group at the terminal of the polymer chain.

The polycarboxylic acid may, for example, be phthalic acid, isophthalic acid, terephthalic acid, naphthalene dicarboxylic acid, trimellitic acid, pyromellitic acid, phthalic anhydride, etc., and from such a viewpoint that the cured film is excellent in weather resistance, isophthalic acid is preferred.

The polyhydric alcohol is, from the viewpoint of excellent adhesion to the substrate and flexibility of the cured film, preferably an aliphatic polyhydric alcohol or alicyclic polyhydric alcohol, more preferably an aliphatic polyhydric alcohol.

The polyhydric alcohol may, for example, be ethylene glycol, diethylene glycol, triethylene glycol, 1,2-propanediol, 1,3-propanediol, 1,3-butanediol, 1,4-butanediol, 1,5-pentanediol, neopentyl glycol, spiro glycol, 1,10-decanediol, 1,4-cyclohexanedimethanol, trimethylolethane, trimethylolpropane, glycerin, pentaerythritol, etc.

The polyhydric alcohol is preferably neopentyl glycol, 1,2-pentanediol, 1,5-pentanediol, trimethylolpropane, etc., and in view of easy availability, neopentyl glycol or trimethylolpropane is particularly preferred.

The number average molecular weight of the polyester resin is preferably at most 5,000 from such a viewpoint that it is thereby possible to reasonably lower the melt viscosity of the molten film. The mass average molecular weight of the polyester resin is preferably from 2,000 to 20,000, particularly preferably from 2,000 to 10,000, from such a viewpoint that it is possible to reasonably lower the melt viscosity of the molten film.

The polyester resin is preferably one having a number average molecular weight of at most 5,000 and a mass average molecular weight of from 2,000 to 20,000, particularly preferably one having a number average molecular weight of at most 5,000 and a mass average molecular weight of from 2,000 to 10,000.

Commercially available products of the polyester resin may, for example, be "CRYLCOAT (registered trademark) 4642-3", "CRYLCOAT (registered trademark) 4890-0" manufactured by Daicel-Allnex Ltd., "U-PICA COAT (registered trademark) GV-110", "U-PICA COAT (registered trademark) GV-250","U-PICA COAT (registered trademark) GV-740","U-PICA COAT (registered trademark) GV-175" manufactured by Japan U-pica Company Ltd., "Uralac (registered trademark) 1680" manufactured by DSM Co., Ltd., etc.

(Acrylic Resin)

An acrylic resin is a polymer having units derived from a (meth)acrylate.

The acrylic resin is preferably one having reactive groups such as carboxy groups, hydroxyl groups, sulfo groups, etc. Such an acrylic resin may improve the dispersibility of other pigments.

The glass transition temperature of the acrylic resin is preferably from 30 to 60° C. When the glass transition temperature is at least the above lower limit value, the coating film is less likely to be susceptible to blocking. When the glass transition temperature of the acrylic resin is at most the above upper limit value, the surface smoothness of the coating film will be further excellent.

The number average molecular weight of the acrylic resin is preferably from 5,000 to 100,000, particularly preferably from 30,000 to 100,000. When the number average molecular weight of the acrylic resin is at least the above lower limit value, the coating film is less likely to be susceptible to blocking. When the number average molecular weight of the acrylic resin is at most the above upper limit value, the surface smoothness of the coating film will be excellent.

The mass average molecular weight of the acrylic resin is preferably from 6,000 to 150,000, more preferably from 10,000 to 150,000, particularly preferably from 15,000 to 150,000. When the mass average molecular weight of the acrylic resin is at least the above lower limit value, the coating film is less likely to be susceptible to blocking. When the mass average molecular weight of the acrylic resin is at most the above upper limit value, the surface smoothness of the coating film will be excellent.

In a case where the acrylic resin has carboxy groups, the acid value of the acrylic resin is preferably from 150 to 400 mgKOH/g. When the acid value of the acrylic resin is at least the above lower limit value, there will be an effect to improve dispersibility of other pigments (F). When the acid value of the acrylic resin is at most the above upper limit value, the coating film will be excellent in moisture resistance.

The acrylic resin is obtainable, for example, by a method of polymerizing a (meth)acrylate such as methyl (meth) acrylate, ethyl (meth)acrylate, etc. by a known radical polymerization.

Commercial products of the acrylic resin may, for example, be "FINEDIC (R) A-249", "FINEDIC (R) A-251" and "FINEDIC (R) A-266", manufactured by DIC Corporation, "ALMATEX (registered trademark) PD6200" and "ALMATEX (registered trademark) PD7310", manufactured by Mitsui Chemicals, Inc., "SANPEX PA-55", manufactured by Sanyo Chemical Industries, Ltd., etc.

(Epoxy Resin)

An epoxy resin is a compound having at least two epoxy groups in the molecule. The epoxy resin may further have reactive groups other than epoxy groups.

The epoxy resin may, for example, be a bisphenol A type epoxy resin, a bisphenol F type epoxy resin, etc.

Commercial product of the epoxy resin may, for example, be "EPICOAT (registered trademark) 1001", "EPICOAT (registered trademark) 1002" and "EPICOAT (registered trademark) 4004P", manufactured by Mitsubishi Chemical Corporation, "EPICLON (registered trademark) 1050" and "EPICLON (registered trademark) 3050", manufactured by DIC Corp., "EPOTOHTO (registered trademark) YD-012" and "EPOTOHTO (registered trademark) YD-014", manufactured by Nippon Steel & Sumikin Chemical Co., Ltd., "DENACOL (registered trademark) EX-711", manufactured by Nagase Chemtex Corp., "EHPE3150", manufactured by Daicel Corp., etc.

(Urethane Resin)

The urethane resin may, for example, be a solid hydroxyl group-terminated prepolymer or isocyanate-terminated prepolymer obtained by reacting a polyol (acrylic polyol, polyester polyol, polyether polyol, etc.) with an isocyanate compound. Such a prepolymer is used in combination with a curing agent. It is also preferred that in place of the hydroxy group-terminated prepolymer, a solid polyol (acrylic polyol, polyester polyol, polyether polyol) is used, and it is used in combination with a solid state curing agent having an isocyanate group or a blocked isocyanate group.

<Pigment (C)>

A metallic pigment is a pigment which gives a metallic texture, and the pigment (C) is made of a metallic pigment covered with a covering material. Particles of the metallic pigment are composed of scaly metallic particles or scaly non-metallic particles having a metal surface. As the scaly non-metallic particles having a metal surface, metal-plated mica particles or glass flake particles may, for example, be mentioned. The pigment (C) is preferably made of scaly metal particles covered with a covering material. The scaly metal particles may, for example, be scaly aluminum particles, nickel particles, stainless steel particles, copper particles, bronze particles, gold particles, silver particles, etc. In particular, scaly aluminum particles are preferred.

As the scaly particles of pigment (C) are covered with a covering material, they are excellent in efficiency for alignment at the time of being formed into a coating film, and in efficiency for mixing with a powder composed of powder particles containing a resin etc.

The covering material is preferably at least one member selected from the group consisting of a resin, an aliphatic compound, an aromatic compound and a silane compound.

The resin may, for example, be a phosphoric acid group-containing resin, an acrylic resin, a silicone resin, a polyethylene resin, etc. The aliphatic compound may, for example, be a fatty acid, an aliphatic amine, etc. The fatty acid is preferably a $C_{4-18}$ long chain fatty acid, and, for example, oleic acid may be mentioned. The aromatic compound may, for example, be styrene, a-methyl styrene, vinyl toluene, divinyl benzene, divinyl benzene monoxide, allyl benzene, diallyl benzene, etc. The silane compound may, for example, be a silane coupling agent. Among these, an acrylic resin is preferred.

The covering method by the covering material may, for example, be coating treatment with a resin, etc., or surface treatment with a long-chain fatty acid or a silane coupling agent.

The covering which scaly particles have on their surface may be a single layer or a plurality of layers.

The SP value of the covering material (the covering material of the outermost layer in the case where the covering is multilayered) on the surface of the pigment (C) exceeds the SP value (A) and is less than the SP value (B).

As the SP value of the coating material is within the above range, it is considered possible to obtain a coating film of a three-layered structure having the layer (B), the layer (C) and the layer (A) laminated in this order from the substrate side, by one coating, when the powder coating material of the present invention is applied.

When a molten film is formed on a substrate, in a case where the molten fluororesin (A) and the molten resin (B) are layer-separated, a liquid-liquid interface is formed in the molten film. At that time, the pigment (C) covered with the coating material having the SP value exceeding the SP value (A) and being less than the SP value (B) moves to the liquid-liquid interface. As an inherent characteristic of the atom, a fluorine atom has high electronegativity, and a metal atom of the metallic pigment has a cation. Therefore, the pigment (C) moved to the liquid-liquid interface, is adsorbed on the surface of the layer of the fluororesin (A), to be in an adsorption equilibrium state. Therefore, it is considered possible to obtain the above-described three-layer structure of the coating film by one coating.

If the SP value of the coating material is close to the SP values (A) or the SP value (B), there may sometimes be a case where the layer separation or the alignment tends to be insufficient, and therefore, the SP value of the covering material is larger than the SP value (A) preferably by at least 0.2 $(J/cm^3)^{1/2}$, more preferably by at least 0.4 $(J/cm^3)^{1/2}$, particularly preferably by at least 0.6 $(J/cm^3)^{1/2}$. Further, it is smaller than the SP value (B) preferably by at least 0.2 $(J/cm^3)^{1/2}$, more preferably by at least 0.4 $(J/cm^3)^{1/2}$, particularly preferably by at least 0.6 $(J/cm^3)^{1/2}$. The larger the difference between the SP value of the covering material and the SP value (A) or the SP value (B), the higher the efficiency for alignment of the pigment (C) at the interface between the layer (B) and the layer (A).

In a case where the fluororesin (A) contains at least two types of fluororesins, the largest SP value among SP values of at least two types of fluororesins will be taken as the SP value (A), and in a case where the resin (B) contains at least two types of resins, the smallest SP value among SP values of at least two types of resins will be taken as the SP value (B), in order to set the SP value of the coating material. Further, in a case where the covering material is in a multilayered structure, SP of the outermost layer of the coating material may be in the range of the SP value of the present invention.

With respect to scaly particles of pigment (C), the average aspect ratio of scaly particles for efficiency in alignment at the liquid-liquid interface, is preferably from 10 to 300, more preferably from 50 to 200.

The "aspect ratio" means a ratio of the maximum length to the thickness of a particle (the longest length/thickness), and the "average aspect ratio" is an average value of aspect ratios of 50 particles randomly selected. The thickness of a particle is measured by an atomic force microscope (hereinafter also referred to as AFM), and the maximum length is measured by a transmission electron microscope (hereinafter also referred to as TEM).

The average particle diameter of the scaly particles of pigment (C) is preferably from 5 to 50 µm, more preferably from 8 to 45 µm, at 50% average volume particle size distribution. When the average particle diameter of the scaly particles is at least the above lower limit value, the primer concealing property of the coating film will be excellent. When the average particle diameter of the scaly particles is at most the above upper limit value, luster of the coating film will be excellent.

The pigment (C) may be suitably selected from among the commercially available metallic pigments, depending upon the respective SP values of the fluororesin (A) and the resin (B). It is also possible to use a metallic pigment produced by a known method. Commercially available products of the metallic pigment may, for example, be trade names "PCU1000", "PCU2000", "PCA9155", "PCR901" and "PCF7620A", (manufactured by ECKART Co., Ltd.), "PCF7601A", "PCF7130A", "0100M", "7620NS" and "Metax Neo NME0205T" (manufactured by Toyo Aluminium K.K.), etc.

<Curing Agent>

A curing agent is one to be contained in a powder coating material in a case where either one or both of the fluororesin (A) and the resin (B) have reactive groups (hydroxy groups, carboxy groups, etc.), and to be capable of being reacted with the above reactive groups. By the reaction of the reactive groups and the curing agent, either one or both of the fluororesin (A) and the resin (B) will be cured by cross-linking or molecular weight increase. As such a curing agent, one which tends to react with the reactive groups at ordinary temperature (e.g. a curing agent having an isocyanate group) is not desirable.

The curing agent is typically a compound having at least two functional groups (hereinafter also referred to as "heat-reactive groups") capable of reacting to the reactive groups of either one or both of the fluororesin (A) and the resin (B) by heating. As the heat-reactive groups, blocked isocyanate groups are preferred. Blocked isocyanate groups become isocyanate groups when the powder coating material is heated and melted so that the blocking agent is eliminated, and the isocyanate groups will then act as reactive groups.

The softening temperature of the curing agent is preferably from 10 to 120° C., particularly preferably from 40 to 100° C. When the softening temperature is at least the above lower limit value, the powder coating material is less likely to cure at room temperature, and particulate agglomerates are less likely to be formed. When the softening temperature is at most the above upper limit value, at the time of producing a powder by melt kneading a resin containing the curing agent, the curing agent can easily be dispersed homogeneously in the powder, and the obtainable powder coating film will be excellent in e.g. surface smoothness, strength and moisture resistance.

As the curing agent, it is possible to use a known compound, and, for example, a blocked isocyanate-type curing agent, an amine-type curing agent (melamine resin, guanamine resin, sulfonamide resin, urea resin, aniline resin, etc.), a β-hydroxyalkylamide-type curing agent, a triglycidyl isocyanurate-type curing agent may be mentioned.

In a case where either one or both of the fluororesin (A) and the resin (B) have hydroxy groups as reactive groups (for example, when the fluororesin (A) is a fluororesin (A1)), the curing agent is preferably a blocked isocyanate-type curing agent from such a viewpoint that adhesion to the substrate, processability of the product after coating, and water resistance of the powder coating film, are excellent.

In a case where either one or both of the fluororesin (A) and the resin (B) have carboxy groups as reactive groups (for example, when the fluororesin (A) is a fluororesin (A2)), the curing agent is preferably a β-hydroxyalkylamide-type curing agent or a triglycidyl isocyanurate-type curing agent.

As the curing agent, one type may be used alone, or two or more types may be used in combination.

The blocked isocyanate-type curing agent is preferably one which is solid at room temperature.

The blocked isocyanate-type curing agent is preferably one produced by reacting an aliphatic, aromatic or araliphatic diisocyanate with a low molecular weight compound having active hydrogen to obtain a polyisocyanate, which is then reacted with a blocking agent for masking.

The diisocyanate may, for example, be tolylene diisocyanate, 4,4'-diphenylmethane isocyanate, xylylene diisocyanate, hexamethylene diisocyanate, 4,4'-methylenebis(cyclohexyl isocyanate), methylcyclohexane diisocyanate, bis(isocyanatomethyl)cyclohexane, isophorone diisocyanate, dimer acid diisocyanate, lysine diisocyanate, etc.

The low molecular compound having active hydrogen may, for example, be water, ethylene glycol, propylene glycol, trimethylolpropane, glycerin, sorbitol, ethylenediamine, ethanolamine, diethanolamine, hexamethylenediamine, isocyanurate, uretdione, a low molecular weight polyester containing hydroxy groups, polycaprolactone, etc.

The blocking agent may, for example, be an alcohol (methanol, ethanol, benzyl alcohol, etc.), a phenol (phenol, cresol, etc.), a lactam (caprolactam, butyrolactam, etc.), or an oxime (cyclohexanone, oxime, methyl ethyl ketoxime, etc.).

<Curing Catalyst>

The curing catalyst is one to promote the curing reaction and to impart good chemical performance and physical performance to the coating film.

In the case of using a blocked isocyanate-type curing agent, the curing catalyst is preferably a tin catalyst (tin octylate, tributyltin laurate, dibutyltin dilaurate, etc.).

As the curing catalyst, one type may be used alone, or two or more types may be used in combination.

<Other Pigments>

Other pigments may, for example, be a luster pigment other than the pigment (C), an anticorrosive pigment, a coloring pigment, an extender pigment, etc.

A luster pigment is a pigment to luster a coating film. The luster pigment other than the pigment (C) may, for example, be a mica powder, a graphite powder, glass flakes, a flaky iron oxide powder, etc.

An anticorrosive pigment is a pigment to prevent corrosion or deterioration of a substrate which is required to have rust resistance. As such an anticorrosive pigment, preferred is a lead-free anticorrosive presenting a less impact on the environment. The lead-free anticorrosive pigment may, for example, be zinc cyanamide, zinc oxide, zinc phosphate, calcium magnesium phosphate, zinc molybdate, barium borate, zinc calcium cyanamide, etc.

A coloring pigment is a pigment to color the coating film. The coloring pigment may, for example, be titanium oxide, carbon black, iron oxide, phthalocyanine blue, phthalocyanine green, quinacridone, isoindolinone, benzimidazolone, dioxazine, etc.

The titanium oxide is preferably one having surface treatment applied to prevent a photocatalytic reaction from taking place, and specifically, titanium oxide surface-treated with silica, alumina, zirconia, selenium, an organic component (polyol, etc.), etc. is preferred, and a titanium oxide pigment having the titanium oxide content adjusted to from 83 to 90 mass % by such treatment, is particularly preferred. When the titanium oxide content is at least the above lower limit value, whiteness of the coating film will be excellent. When the titanium oxide content is at most the above upper limit value, the coating film tends to be hardly degraded.

An extender pigment is a pigment to improve the hardness of the coating film and to increase the thickness of the coating film. It is preferred to incorporate it also from such a viewpoint that the cut surface of the coating film looks clean when the coated article such as an exterior building member is cut. The extender pigment may, for example, be talc, barium sulfate, mica, calcium carbonate, etc.

<Other Additives>

Other additives may, for example, be ultraviolet absorbers (various organic ultraviolet absorbents, inorganic ultraviolet absorbers, etc.), light stabilizers (hindered amine light stabilizers, etc.), matting agents (super micronized synthetic silica, etc.), surfactants (nonionic, cationic or anionic), leveling agents, surface modifiers (to improve the surface smoothness of the coating film), plasticizers, degassing agents (effective to discharge, out of the coating film, air entrained in the powder, a blocking agent coming out of the curing agent, moisture, etc. so that they do not remain inside the coating film, and, usually, the degassing agents are solid, but, when melted, become to have a very low viscosity), fillers, heat stabilizers, thickeners, dispersing agents, antistatic agents, rust inhibitors, silane coupling agents, antifouling agents, low pollution treatment agents, etc.

It is also possible to use a binder as other additive. A binder is one to be used as attached to the surface of powder particles by treatment of the powder, and is used in order to facilitate binding of a plurality of powder particles or to improve the surface properties of the powder particles.

As the binder, a cationic surfactant, an anionic surfactant, an amphoteric surfactant and a nonionic surfactant, a silane coupling agent, etc., may be mentioned.

The cationic surfactant may, for example, be an amine salt, a quaternary ammonium salt, etc.

The anionic surfactant may, for example, be an aromatic sulfonate, a higher alcohol sulfuric ester salt, a polyoxyethylene alkyl ether sulfate, an $\alpha$-sulfo fatty acid ester, an $\alpha$-olefin sulfonate, a monoalkyl phosphate ester salt, an alkanesulfonic acid salt, etc.

The amphoteric surfactant may, for example, be an alkyl betaine, an alkyl amino fatty acid salt, an alkyl amine oxide, etc.

The nonionic surfactant may, for example, be a sugar ester-type surfactant such as a sorbitan fatty acid ester, a polyoxyethylene sorbitan fatty acid ester, etc., a fatty acid ester-type surfactant such as a polyoxyethylene resin acid ester, a polyoxyethylene fatty acid diethyl ester, etc., an ether-type surfactant such as a polyoxyethylene alkyl ether, a polyoxyethylene alkyl phenyl ether, a polyoxyethylene-polypropylene glycol, etc.

The silane coupling agent may, for example, be an aminosilane-type silane coupling agent, an epoxysilane-type silane coupling agent, an ureidosilane-type silane coupling agent, an isocyanate silane-type silane coupling agent, etc.

In the case of treating a powder with a binder, it is possible to use a binder solution prepared by adding a solvent to the binder. In the case of using the binder solution, it is preferred to remove the solvent from the powder after the treatment, by treatment such as heating.

The solvent to be used for the binder solution is not particularly limited, and, for example, an alkane such as pentane, hexane, heptane, octane, etc., an isoparaffin such as isopentane, isohexane, isoheptane, isooctane, etc., an alcohol such as methanol, ethanol, etc., a fluorinated solvent such as 1,1,1,3,3-pentafluorobutane, 1,1,1,2,2,3,4,5,5,5-decafluoropentane, 1,1,1,2,2,3,3,4,4,5,5,6,6-tridecafluorohexane, 1,1,2,2-tetrafluoro-1-(2,2,2-trifluoroethoxy) ethane, etc., a silicone oil such as an organopolysiloxane, etc., may be mentioned. In particular, a fluorinated solvent or a silicone oil is preferred from such a viewpoint that it presents a low solubility to the fluororesin (A) or the resin, and a good solubility to the binder.

<Composition of Constituents of Powder Coating Material>

The content of the pigment (C) to the total amount of the powder coating material of the present invention is from 0.7 to 23 mass %, preferably from 0.7 to 20 mass %, particularly preferably from 1 to 15 mass %. When the content of the pigment (C) is at least the lower limit value in the above range, the incidence of light into the layer (B) is sufficiently prevented by the aligned pigment (C) present in the layer (C), whereby weather resistance of the layer (B) will be excellent. Also, the coating film will be excellent in metallic hue and concealing property. When the content of the pigment (C) is at most the upper limit value in the above range, it is possible to prevent bleeding out of the pigment (C) from the surface of the coating film formed. By the prevention of bleeding out of the pigment (C), the coating film will be excellent in weather resistance.

The content of the pigment (C) is an amount including the covering material.

Here, in a case where the pigment (C) in the powder coating material is all contained in the powder (C), the content of the pigment (C) to the total amount of the powder coating material is equal to the content of the powder (C) to the total amount of the powder coating material.

In the powder coating material of the present invention, the mass ratio of the fluororesin (A) to the resin (B) (fluororesin (A)/resin (B)) is preferably from 90/10 to 10/90, more preferably from 85/15 to 15/85, particularly preferably from 80/20 to 20/80. When the proportion of the fluororesin (A) is at least the above lower limit value, the weather resistance of the coating film will be excellent. When the proportion of the resin (B) is at least the above lower limit value, it is possible to reduce the cost of the powder coating material.

In a case where the fluororesin (A) is a fluororesin having reactive groups and the powder coating material contains a curing agent to cure the fluororesin (A), the content of the curing agent is preferably from 1 to 50 parts by mass, particularly preferably from 3 to 30 parts by mass, to 100 parts by mass of the fluororesin (A).

In a case where the fluororesin (A) is a fluororesin (A1) and the curing agent is a blocked isocyanate-type curing agent, the content of the blocked isocyanate-type curing agent is such that the molar ratio of isocyanate groups to the hydroxy groups of the fluororesin (A1) is preferably from 0.05 to 1.5, particularly preferably from 0.8 to 1.2. If the molar ratio is at least the above lower limit value, the curing degree of the powder coating material will be high, and the coating film will be excellent in hardness and chemical resistance, etc. When the molar ratio is at most the above upper limit value, the coating film will be less likely to become brittle, and moreover, heat resistance, chemical resistance, moisture resistance, etc. will be excellent.

In a case where the resin (B) is a resin having reactive groups, and the powder coating material contains a curing agent to cure the resin (B), similarly to the above, the content of the curing agent is preferably from 1 to 50 parts by mass, particularly preferably from 3 to 30 parts by mass, to 100 parts by mass of the resin (B). In a case where the resin (B) is a resin having hydroxy groups or carboxy groups, and the curing agent is a blocked isocyanate-type curing agent, the molar ratio of isocyanate groups to the total amount of hydroxy groups and carboxy groups in the resin (B) is also preferably from 0.05 to 1.5, particularly preferably from 0.8 to 1.2, for the same reason as described above.

Likewise, also in a case where each of the fluororesin (A) and the resin (B) is a resin having reactive groups, the content of the curing agent is preferably from 1 to 50 parts by mass, particularly preferably from 3 to 30 parts by mass, to 100 parts by mass in total of the fluororesin (A) and the resin (B). The molar ratio of a blocked isocyanate-type curing agent is also the same.

In a case where the powder coating material contains a curing catalyst, the content of the curing catalyst is preferably from 0.0001 to 10.0 parts by mass to 100 parts by mass in total of the components other than the pigment (pigment (C) and other pigments) in the powder coating material. When the content of the curing catalyst is at least the above lower limit value, the catalytic effect tends to be sufficiently obtainable. When the content of the curing catalyst is at most the above upper limit value, a gas such as air included in the powder coating material during the curing process, tends to be readily removed, whereby reduction of the heat resistance, weather resistance and water resistance of the coating film caused by the remaining gas, will be less.

In a case where the powder coating material contains other pigments, the content of other pigments is preferably from 0.5 to 50 parts by mass, particularly preferably from 5 to 40 parts by mass, to 100 parts by mass in total of the fluororesin (A) and the resin (B) in the powder coating material. When the content of other pigments is at most the above upper limit value, the weather resistance and adhesion of the coating film will be further excellent. When the content of other pigments is at least the above lower limit value, the concealing property of the coating film will be further excellent.

Further, in a case where the powder coating material contains other additives, the content of other additives (in a case where plural types are contained, their total) to the total mass of the fluororesin (A) and the resin (B) in the powder coating material, is preferably at most 30 mass %, particularly preferably at most 20 mass %.

<Powders Constituting Powder Coating Material>

As described above, as powders constituting the powder coating material of the present invention, the powder (A), the powder (B), the powder (AB) and the powder (C) are mentioned. The powder coating material of the present invention may optionally contain a powder other than these powders.

As the powder which may be optionally contained in the powder coating material of the present invention, a powder made of at least one of the above-exemplified components may be mentioned. Specifically, a powder made of a curing agent, a powder made of other pigments, etc. may be mentioned. The content of these powders in the powder coating material, may be an amount equivalent to the content of a component in the powder coating material, or is preferably less, since such a powder component may be contained as a component of another powder. For example, other pigments may be contained in the powder coating material, as powder particles separate from the powder particles of the powder (A) to the powder (C).

As described above, the powder coating material of the present invention may be a powder mixture comprising the powder (A), the powder (B) and the powder (C), or a powder mixture comprising the powder (AB) and the powder (C).

In a case where the fluororesin (A) in the powder (A) is a fluororesin having reactive groups, powder particles of the powder (A) preferably contain a curing agent or a curing catalyst to cure the fluororesin (A). In a case where the resin (B) in the powder (B) is a resin having reactive groups, powder particles of the powder (B) preferably contain a curing agent or a curing catalyst to cure the resin (B). In a case where at least one of the fluororesin (A) and the resin (B) in the powder (AB) is a resin having reactive groups, powder particles of the powder (AB) preferably contain a curing agent or a curing catalyst to cure such a resin.

A part of the pigment (C) may be contained in powder particles of at least any of the powder (A), the powder (B) and the powder (AB), but preferably may not be contained in such powder particles. At least a part of other pigments may be contained in powder particles of at least any of the powder (A), the powder (B) and the powder (AB) or may be contained in the powder (C). Otherwise, other pigments may be contained in the powder coating material, as powder particles separate from powder particles of the powder (A)

to the powder (C), but in the case of other pigments which are too small as powder particles of the powder coating material, they are preferably contained in powder particles of at least any of the powder (A), the powder (B) and the powder (AB).

Other additives are preferably contained in powder particles of at least any of the powder (A), the powder (B) and the powder (AB).

In the powder coating material, the sum of the resin-containing powder (the powder (A) and the powder (B), or the powder (AB)) and the powder (C) is preferably at least 10 mass %, more preferably at least 20 mass %, further preferably at least 50 mass %, to the entire amount (100 mass %) of the powder coating material,. The upper limit is not particularly limited and may be 100 mass %.

<Advantageous Effects>

In the powder coating material of the present invention, by using the fluororesin (A), the resin (B) and the pigment (C), which have a specific relationship in the SP values, it is possible to obtain, by one coating, a coating film of a three-layered structure having the layer (B), the layer (C) and the layer (A) layer-separated in this order from the substrate side.

The fluororesin (A) or its cured product is excellent in weather resistance, and since a layer composed mainly of this is positioned as the outermost layer on the air side, the coating film will be excellent in weather resistance. Further, it will be excellent also in chemical resistance such as acid resistance.

Since the pigment (C) is aligned in parallel to the substrate, the coating film will be excellent in metallic hue. Further, since the metallic pigment (C) is not exposed on the surface of the coating film, discoloration of the pigment (C) due to an influence of oxygen, chemicals, etc. is unlikely to occur. Further, even if the blend amount of other pigments (such as titanium oxide, etc.) is made to be less than before, or even if no other pigments are blended, sufficient concealing properties will be obtainable by the pigment (C). If the content of other pigments is less, the surface of the coating film in contact with the substrate will be occupied more by the resin (B) or its cured product, whereby the coating film will be excellent in adhesion to the substrate.

[Method for Producing Powder]

Each powder in the present invention is produced by mixing and powdering constituents of each powder. A powder containing resin components is preferably obtained by melt-mixing the resin components and other components, cooling the molten mixture, and powdering the obtained solid mixture. In the case of a powder composed of solid components containing no such a melting component as a resin component, it is possible to adjust the solid components to have a size and shape suitable as constituent particles of the powder coating material by e.g. pulverization and classification, thereby to obtain a powder suitable as a raw material powder for a powder coating material. In some cases, a commercially available powder may be used as it is, as a raw material powder for a powder coating material. A component which is not solid at room temperature, may be used as contained in a powder containing a resin component.

As the powder (C), a commercially available metallic powder pigment may be used as it is, or, as the case requires, a commercially available metallic powder pigment may be classified and then used. In the case of using the powder (C) comprising a plurality of metallic pigments, commercially available metallic pigment powders may be mixed and then used. Further, in the case of using a metallic pigment which is not covered with a covering material, the pigment particles may be covered with a covering material to obtain a pigment (C), and the powder of pigment (C) thus obtained, may be used as the powder (C).

As a powder containing a resin component, for example, a powder (A) is preferably obtained by mixing a fluororesin (A) with a component such as a curing agent, a curing catalyst, etc., as the case requires, melt-kneading the mixture, followed by cooling to obtain a solid kneaded product, pulverizing the solid kneaded product, followed by classification as the case requires, to obtain a powder (A) composed of powder particles of a size and shape suitable as constituent particles of a powder coating material. The powder (B) and the powder (AB) may be prepared in the same manner.

In the production of a powder containing a resin component, in a case where the powder contains a reactive component such as a curing agent, it is necessary that at the time of melt-kneading, the melt kneading is conducted under such a condition that the reactive component does not react. For example, in the case of producing a powder (A) containing a fluororesin (A1) and a blocked isocyanate-type curing agent, the melt-kneading is carried out at a temperature where the fluororesin (A1) is melted and where no deblocking of the blocked isocyanate-type curing agent takes place.

After the respective components are mixed to prepare a mixture, the mixture is melt-kneaded and cooled to form a solid kneaded product, whereby it is possible to obtain a solid kneaded product having the respective components homogenized.

It is preferred that the respective components are preliminarily pulverized into a powder form and then mixed.

The apparatus to be used for mixing may, for example, be a high speed mixer, a V type mixer, an inverted mixer, etc.

The apparatus to be used for melt-kneading may, for example, be an uniaxial extruder, a biaxial extruder, a planetary gear, etc.

The kneaded product is, after cooling, preferably made into a solid kneaded mixture in the form of pellets or the like.

The apparatus to be used for pulverizing a solid kneaded mixture may, for example, be a pulverizer such as a pin mill, a hammer mill, a jet mill, etc.

In order to remove a powder with a particle size being too large or a powder with a particle size being too small, it is preferred to carry out classification after pulverization. In the case of carrying out classification, it is preferred to remove at least either particles with a particle size of less than 10 μm or particles with a particle size exceeding 100 μm. The particle size distribution after classification is preferably at a level of from about 20 to 80 μm.

The classification method may, for example, be a sieving method or an air classification method.

The average particle diameters of the powder (A), the powder (B) and the powder (AB) may, for example, be preferably from 25 to 50 μm in a 50% average volume particle size distribution.

The preferred range of the average particle size of the powder (C) is the same as the preferred range of the average particle size of the pigment (C).

Measurement of the particle size of a powder is usually conducted by using a particle size measuring instrument of a type to capture a potential change at the time of passing through a pore, a laser diffraction system, an image determination type, a sedimentation rate measurement system, etc.

[Method for Producing Powder Coating Material]

The powder coating material of the present invention may be produced by mixing the above-described respective powders so that the contents of the respective constituent components would be the above-mentioned contents. After thus obtaining a powder mixture, as described above, the powder mixture may be treated with a binder solution to obtain a powder coating material of the present invention. Further, it is also possible to mix powders treated with the binder solution to obtain a powder coating material.

The powder coating material of the present invention is preferably a powder coating material obtainable by mixing the powder (A), the powder (B) and the powder (C), or a powder coating material obtainable by mixing the powder (AB) and the powder (C).

The mixing method may, for example, be a dry blending method, a bonding method by heat fusion, a bonding method by a binder solution, etc. The apparatus to be used for mixing may, for example, be a high speed mixer, a double cone mixer, a kneader, a tumbler mixer, a mixing shaker, a drum shaker, a rocking shaker, etc.

[Coated Article]

The coated article of the present invention has, on the surface of a substrate, a coating film formed from the powder coating material of the present invention as described above.

The material of the substrate is not particularly limited, and may, for example, be an inorganic material, an organic material, an organic-inorganic composite material, etc. The inorganic material may, for example, be concrete, natural stone, glass, metal (iron, stainless steel, aluminum, copper, brass, titanium, etc.), etc. The organic material may, for example, be plastic, rubber, adhesive, wood, etc. The organic-inorganic composite material may, for example, be fiber-reinforced plastic, resin reinforced concrete, fiber reinforced concrete, etc.

Among the above, a metal is preferred, and aluminum is particularly preferred. A substrate made of aluminum is excellent in corrosion resistance and light in weight, and has an excellent performance in application for building materials such as exterior members.

The shape, size, etc. of the substrate are not particularly limited.

Examples of the substrate include composite panels, curtain wall panels, frames for curtain walls, exterior members for buildings such as window frames, automotive members such as tire wheels (aluminum wheels), frames of construction equipment, motorcycles, etc.

The water contact angle of the surface of a coating film is preferably from 1 to 55 degrees, particularly preferably from 3 to 50 degrees. When the water contact angle is at least the above lower limit value, the coating film is less likely to be eroded by an organic acid component derived from bird droppings or dead bugs, and further, generation of mold on the surface of the coating film is suppressed (the generation of mold tends to lead to poor appearance). When the water contact angle is at most the above upper limit value, contamination resistance will be excellent.

The thickness of the coating film is not particularly limited but is preferably from 20 to 1,000 μm, more preferably from 20 to 500 μm, further preferably from 20 to 300 μm. In an application to e.g. a member for a high-rise building, such as an aluminum curtain wall, etc., it is preferably from 20 to 90 μm. In an application where the demand for weather resistance is high, such as an outdoor unit of an air conditioner that is installed on the coast, a traffic signal pole, a sign, etc., it is preferably from 100 to 200 μm.

[Method for Producing Coated Article]

The coated article of the present invention may be produced by forming a molten film of the powder coating material of the present invention on a substrate, and cooling the molten film to be a solid coating film. As described above, layer separation is likely to take place in the molten film to form the layer (B), the layer (C) and the layer (A) in this order from the substrate side. Further, in a case where the powder coating material is a powder coating material comprising a resin having reactive groups and a curing agent, the resin is cured by a reaction in the molten film, whereby the powder coating material becomes to be a coating film comprising the cured resin.

The molten film may be formed by adhering the powder coating material to the surface of a substrate and melting the adhered powder to form a molten film, or the powder coating material may be melted before depositing it to the substrate, and the molten powder coating material may be adhered to the substrate to form a molten film.

In a case where the powder coating material contains a reactive component such as a curing agent, there may be a case where the curing reaction of the reactive component in the composition begins substantially at the same time as the powder coating material is heat-melted, and in such a case, it is preferred to carry out the heat-melting of the powder coating material and adhesion to the substrate substantially at the same time, or to carry out the heat-melting of the powder coating material after adhesion of the powder coating material to the substrate.

In a case where a molten powder coating material is to be adhered to the substrate, it is necessary to adhere it to the substrate within a short time after being melted, and therefore, for example, a method may be employed wherein immediately after melting the powder coating material, the molten material is deposited on the substrate, or the powder coating material is sprayed and melted before it reaches the substrate.

As the method for producing a coated article of the present invention, preferred is a method in which the powder coating material of the present invention is adhered to a substrate to form a film of the powder, then the film of the powder is heated to form a film composed of a melt of the powder, and the film composed of the melt is cooled to form a coating film.

The heating temperature (hereinafter also referred to as the baking temperature) and the heating maintaining time (hereinafter also referred to as the baking time) to heat and melt the powder coating material and to maintain the molten state for a predetermined time, are suitably set depending upon the types and composition of raw material components of the powder coating material, the desired thickness of the coating film, etc.

In a case where the powder coating material does not contain a curing agent, the baking temperature is preferably from 160 to 300° C. When the powder coating material contains a curing agent, the baking temperature is preferably set depending on the reaction temperature of the curing agent. For example, in the case of using a blocked isocyanate-type curing agent as the curing agent, the baking temperature is preferably from 120 to 240° C.

The reaction temperature of the curing agent is obtained by measuring a change in the elastic modulus of the powder coating material. The change in the elastic modulus may be measured by using a rheometer such as Rheometer ARES, manufactured by TA Instruments.

The baking time is preferably from 2 to 60 minutes. In a case where the powder coating material does not contain a curing agent, it is more preferably from 5 to 60 minutes, particularly preferably from 10 to 50 minutes. In a case where the powder coating material contains a curing agent, it is more preferably from 2 to 50 minutes, particularly preferably from 5 to 40 minutes. When the baking time is at least the above lower limit value, the pigment (C) will be well aligned at the liquid-liquid interface (the interface between the layer (A) and the layer (B)) in the molten film. When the baking time is at most the above upper limit value, the reaction of the curing agent proceeds and adhesion will be excellent.

The coating method may be a known method, such as an electrostatic coating method, an electrostatic spraying method, an electrostatic dipping method, a misting method, a flow immersion method, a blowing method, a spray method, a thermal spraying method, a plasma spraying method, etc.

An electrostatic coating method using a powder coating gun is preferred from such a viewpoint that even when the molten film is made to be thin, surface smoothness of the molten film will be excellent, and further, the concealing property of the coating film will be excellent.

The powder coating gun to be used in the electrostatic coating method may, for example, be a corona charging type coating gun or a triboelectric charging type coating gun. The corona charging type coating gun is one to spray a powder coating material subjected to corona discharge treatment. The triboelectric charging type coating gun is one to spray a powder coating material subjected to triboelectric charging treatment.

Coating conditions may suitably be selected from known conditions depending on the types of the fluororesin (A) and the resin (B).

The molten film in a molten state is cooled to room temperature (20 to 25° C.) to form a coating film. In a case where the powder coating material contains a curing agent, a cured film will be formed as the coating film.

Cooling after the baking may be either quenching or annealing, but annealing is preferred in that the coating film is thereby less likely to be peeled.

EXAMPLES

Now, the present invention will be described in detail with reference to Examples. However, the present invention is not limited to these Examples.

Among the following Ex. 1 to 18, Ex. 1 to 7, 13, 15 to 16, and 19 to 22 are Examples of the present invention, and Ex. 8 to 12, 14, and 17 to 18 are Comparative Examples.

The materials used in Ex. are as follows.
[Materials Used]
<Fluororesin (A)>

Fluororesin (A-1): a copolymer of chlorotrifluoroethylene (CTFE)/cyclohexyl vinyl ether (CHVE)/4-hydroxybutyl vinyl ether (HBVE) =50/35/15 (molar ratio) obtained in the following Production Example 1. The fluororesin (A-1) had a SP value of 18.4 $(J/cm^3)^{1/2}$, a number average molecular weight of 12,000, and a fluorine content of 25 mass %.

Fluororesin (A-2): a copolymer of CTFE/tert-butyl vinyl ether (t-BuVE)/HBVE/vinyl pivalate (VPV) =50/11/4/35 (molar ratio) obtained in the following Production Example 2. The fluororesin (A-2) had a SP value of 17.8 $(J/cm^3)^{1/2}$, a number average molecular weight of 12,000, and a fluorine content of 25 mass %.

Fluororesin (A-3): PVDF (PVDF DS203, manufactured by Dongyue Co.). The fluororesin (A-3) had a SP value of 17.6 $(J/cm^3)^{1/2}$, a number average molecular weight of 270,000 and a fluorine content of 33 mass %.

Production Example 1

Production of Fluororesin (A-1)

Into a stainless steel autoclave equipped with a stirrer and having an inner volume of 250 mL, 51.2 g of CHVE, 13.3 g of HBVE, 55.8 g of xylene, 15.7 g of ethanol, 1.1 g of potassium carbonate, 0.7 g of a 50 mass % xylene solution of tert-butyl peroxypivalate (PBPV) and 63.0 g of CTFE were introduced. Then, the temperature was gradually raised and after reaching 55° C., held for 20 hours. Thereafter, it was raised to 65° C. and held for 5 hours. Then, after cooling, filtration was conducted to remove the residue and to obtain a fluororesin (A-1).

Production Example 2

Production of Fluororesin (A-2)

Into a stainless steel autoclave equipped with a stirrer having an inner volume of 250 mL, 10.4 g of t-BuVE, 13.2 g of HBVE, 38.5 g of VPV, 55.0 g of xylene, 15.7 g of ethanol, 1.1 g of potassium carbonate, 0.7 g of a 50 mass % xylene solution of PBPV and 63.0 g of CTFE were introduced. Then, the temperature was gradually raised, and after reaching 55° C., held for 20 hours. Thereafter, it was raised to 65° C. and held for 5 hours. Then, after cooling, filtration was conducted to remove the residue and to obtain a fluororesin (A-2).
<Resin (B)>

Resin (B-1): a polyester resin. Product name "CRYLCOAT (registered trademark) 4890-0" (manufactured by Daicel-Allnex Ltd.). The resin (B-1) had a number average molecular weight (Mn) of 2,500 and a SP value of 22.8 $(J/cm^3)^{1/2}$.

Resin (B-2): a polyester resin. Product name "U-PICA COAT (registered trademark) GV-740" (manufactured by Japan U-pica Company Ltd.). The resin (B-2) had a number average molecular weight (Mn) of 3,700 and a SP value of 28.8 $(J/cm^3)^{1/2}$.

Resin (B-3): an acrylic resin. Product name "ARUFON (registered trademark) UH-2170" (manufactured by Toagosei Co., Ltd.). The resin (B-3) had a number average molecular weight (Mn) of 15,500 and a SP value of 18.8 $(J/cm^3)^{1/2}$.

Resin (B-4): an epoxy resin. Product name "EPOTOHTO (registered trademark) YDCN704" (manufactured by Tohto Kasei Co., Ltd.). The resin (B-4) had a number average molecular weight (Mn) of 1,300 and a SP value of 22.0 $(J/cm^3)^{1/2}$.
<Pigment (C)>

Pigment (C-1): an aluminum-type metallic pigment. Product name "PCF7620A" (manufactured by Toyo Aluminium K.K.). Covering material: an acrylic resin (SP value: 21.8 $(J/cm^3)^{1/2}$).

Pigment (C-2): an aluminum-type metallic pigment. Product name "PCR901" (manufactured by ECKART). Covering material: silica and an aliphatic amine (SP value: 19.2 $(J/cm^3)^{1/2}$).

Pigment (C-3): an aluminum-type metallic pigment. Product name "0100M" (manufactured by Toyo Aluminium K.K.). Covering material: stearic acid (SP value: 18.2 $(J/cm^3)^{1/2}$).

Pigment (C-4): an aluminum-type metallic pigment. Product name "7620NS" (manufactured by Toyo Aluminium K.K.). Covering material: oleic acid (SP value: 18.4 $(J/cm^3)^{1/2}$).

Pigment (C-5): an aluminum-type metallic pigment. Product name "PCU1000" (manufactured by ECKART). Covering material: an acrylic resin and silica (SP value: 21.0 $(J/cm^3)^{1/2}$).

Pigment (C-6): an aluminum-type metallic pigment. Product name "Metax Neo NME0205T" (manufactured by Toyo Aluminium K.K.). Covering material: a polyethylene resin and stearic acid (SP value: 18.8 $(J/cm^3)^{1/2}$).

<Curing Agent>

Curing agent (D-1): product name "VESTAGON (registered trademark) B-1530" (manufactured by EVONIK). Blocked isocyanate-type curing agent, reaction temperature: 160° C.

<Curing Catalyst>

Curing catalyst (E-1): a xylene solution of dibutyltin dilaurate (10,000 fold diluted product).

<Other Pigments>

Titanium oxide pigment: Ti-Pure R960 (trade name, manufactured by DuPont, titanium oxide content: 89 mass %).

<Other Additives>

Degassing agent: benzoin.

Surface modifier 1: Trade name: BYK-360P manufactured by BYK-Chemie GmbH.

Surface modifier 2: Trade name: CERAFLOUR 960 (micronized modified amide wax, melting point: 145° C.), manufactured by BYK-Chemie GmbH.

Binder solution 1: a solution comprising 7.0 parts by mass of a non-ionic surfactant (trade name: NAROACTY CL-400, manufactured by Sanyo Chemical Industries, Ltd.) and 97.0 parts by mass of a fluorinated solvent (1,1,2,2-tetrafluoro-1-(2,2,2-trifluoroethoxy)ethane).

Binder solution 2: a solution comprising 7.0 parts by mass of an isocyanate silane-type silane coupling agent (trade name: KBE-9007, manufactured by Shin-Etsu Chemical Co., Ltd.) and 97.0 parts by mass of silicone oil (trade name: KBE-9007, manufactured by Shin-Etsu Chemical Co., Ltd.).

Production Example

Production of Powder and Powder Coating Material

Components shown in Tables 1 to 3 in amounts (unit: parts by mass) shown in Tables 1 to 3 were mixed for from about 10 to 30 minutes using a high speed mixer (manufactured by Yusaki Co., Ltd.) to obtain a powdery mixture. Using a biaxial extruder (16 mm extruder, manufactured by Thermo Prism Ltd.), the mixture was melt-kneaded at a barrel set temperature of 120° C., to obtain pellets. Using a pulverizer (product name: a rotor speed mill P14, manufactured by FRITSCH), the pellets were pulverized at room temperature and classified by 150 mesh, to obtain a powder (A-1) to (A-3), (B-1) to (B-4), (AB-1) or (ABC-1) having an average particle size of about 40 μm. The amounts of the respective components shown in Tables 1 to 3 are values of pure contents of the components. Here, "powder (ABC)" refers to a powder composed of powder particles comprising the fluororesin (A), the resin (B) and the pigment (C).

TABLE 1

| | | Powder (A) | | |
|---|---|---|---|---|
| | | A-1 | A-2 | A-3 |
| Fluororesin (A) | A-1 | 75 | — | — |
| | A-2 | — | 65 | — |
| | A-3 | — | — | 95.4 |
| Curing agent | D-1 | 20 | 30 | — |
| Curing catalyst | E-1 | 0.0008 | 0.0008 | — |
| Other additives | Degassing agent | 0.5 | 0.5 | 0.5 |
| | Surface modifier 1 | 1.5 | 1.5 | 1.8 |
| | Surface modifier 2 | 3 | 3 | 2.3 |

TABLE 2

| | | Powder (B) | | | |
|---|---|---|---|---|---|
| | | B-1 | B-2 | B-3 | B-4 |
| Resin (B) | B-1 | 81.6 | — | — | — |
| | B-2 | — | 81.6 | — | — |
| | B-3 | — | — | 81.6 | — |
| | B-4 | — | — | — | 81.6 |
| Curing agent | D-1 | 12 | 12 | 12 | 12 |
| Curing catalyst | E-1 | 0.00096 | 0.00096 | 0.00096 | 0.00096 |
| Other additives | Degassing agent | 0.6 | 0.6 | 0.6 | 0.6 |
| | Surface modifier 1 | 1.8 | 1.8 | 1.8 | 1.8 |
| | Surface modifier 2 | 4 | 4 | 4 | 4 |

TABLE 3

| | | Powder (AB) AB-1 | Powder (ABC) ABC-1 |
|---|---|---|---|
| Fluororesin (A) | A-1 | 28.9 | 20.2 |
| Resin (B) | B-1 | 28.9 | 47.0 |
| Pigment (C) | C-6 | — | 3.0 |
| Curing agent | D-1 | 18.6 | 21.6 |
| Curing catalyst | E-1 | 0.0008 | 0.0010 |
| Other pigment | Titanium oxide pigment | 19.2 | 3.4 |
| Other additives | Degassing agent | 0.6 | 0.7 |
| | Surface modifier 1 | 1.2 | 1.3 |
| | Surface modifier 2 | 2.5 | 2.8 |

Ex. 1 to 22

In Ex. other than the following, a powder coating material was obtained by dry-blending the powder (C) made of the pigment (C) and the powder (A), the powder (B) and the powder (AB) shown in Tables 1 to 3 in amounts (unit: parts by mass) shown in Tables 4 and 5. The dry blending was carried out by mixing by means of a spatula.

In Ex. 2, 3, 13, 14, 21 or 22, powders shown in Tables 1 to 3 in amounts (unit: parts by mass) shown in Tables 4 and 5 were mixed in a 1 liter measuring flask, and further, a binder solution shown in Tables 4 and 5 in an amount (unit:

part by mass) shown in the Tables was added. At 25° C. for 30 minutes, the flask was rotated for mixing by using an evaporator, followed by drying in vacuum for an additional 20 minutes, to obtain a powder. The obtained powder was classified with a net (mesh opening 100 μm), to obtain a powder coating material. In Ex. 2, 3, 13, 14, 21 or 22 using a binder solution, a fluorinated solvent or silicone oil was removed, and such a solvent was substantially not contained in the obtained powder coating material.

In Ex. 19, the powder (ABC-1) shown in Table 3, was directly used as a powder coating material.

In Ex. 20, the powder (C) made of the pigment (C) and the powder (AB) shown in Table 3 in amounts (unit: parts by mass) shown in Table 5 were thermal fusion blended to obtain a powder coating material. The thermal fusion blending was carried out by a method wherein the powder (C) and the powder (AB) were charged to a 1 liter measuring flask, and at 40° C. for 30 minutes, the flask was rotated for mixing by using an evaporator. After the mixing, the obtained powder was classified with a net (mesh opening 100 μm), to obtain a powder coating material.

The unit for SP values in Tables 6 to 8 is $(J/cm^3)^{1/2}$. Further, "SP (B-A)" represents the difference in the SP value between the resin (B) and the fluororesin (A), and "SP (C-A)" represents the difference in the SP value between the pigment (C) and the fluororesin (A), and "SP (B-C)" represents the difference in the SP value between the resin (B) and the pigment (C).

(Preparation of Test Specimen)

Using the above powder coating material, electrostatic coating was applied on one surface of an aluminum plate (substrate) subjected to chromate treatment, by means of an electrostatic coating machine equipped with a powder coating gun (trade name: GX3600C, manufactured by Onoda Cement Co., Ltd.) and maintained in an atmosphere of 200° C. for 20 minutes, and then left to cool to room temperature to obtain an aluminum plate having a coating film (cured film) with a thickness of from 55 to 65 μm.

(Hue (Luster) of Coating Film)

The state of the coating film surface of the test specimen was visually observed and evaluated by the following standards.

○ (very good): Highly metallic hue.
Δ (good): Usual metallic hue.
x (bad): Low metallic hue.

TABLE 4

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Powder (A) | A-1 | 48.5 | 48.5 | — | — | — | 48.5 | — | 48.5 | 48.5 | 48.5 | 97 |
|  | A-2 | — | — | 48.5 | 48.5 | 48.5 | — | — | — | — | — | — |
|  | A-3 | — | — | — | — | — | — | 48.5 | — | — | — | — |
| Powder (B) | B-1 | 48.5 | 48.5 | 48.5 | — | — | 48.5 | — | 48.5 | 48.5 | — | — |
|  | B-2 | — | — | — | 48.5 | — | — | — | — | — | — | — |
|  | B-3 | — | — | — | — | 48.5 | — | — | — | — | 48.5 | — |
|  | B-4 | — | — | — | — | — | 48.5 | — | — | — | — | — |
| Powder (AB) | AB-1 | — | — | — | — | — | — | — | — | — | — | — |
| Powder (ABC) | ABC-1 | — | — | — | — | — | — | — | — | — | — | — |
| Powder (C) | C-1 | 3 | — | — | — | — | 3 | — | — | — | — | 3 |
|  | C-2 | — | 3 | — | 3 | — | — | — | — | 3 | — | — |
|  | C-3 | — | — | 3 | — | — | — | — | 3 | — | — | — |
|  | C-4 | — | — | — | — | 3 | — | 3 | — | — | — | — |
|  | C-5 | — | — | — | — | — | 3 | — | — | — | — | — |
| Binder solution 1 |  | — | 97 | 97 | — | — | — | — | — | — | — | — |
| Binder solution 2 |  | — | — | — | — | — | — | — | — | — | — | — |

TABLE 5

|  |  | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|
| Powder (A) | A-1 | — | — | — | 49.5 | 30 | 49.5 | 25 | — | — | — | — |
|  | A-2 | — | — | — | — | — | — | — | — | — | — | — |
|  | A-3 | — | — | — | — | — | — | — | — | — | — | — |
| Powder (B) | B-1 | 97 | — | — | 49.5 | 50 | 50 | 50 | — | — | — | — |
|  | B-2 | — | — | — | — | — | — | — | — | — | — | — |
|  | B-3 | — | — | — | — | — | — | — | — | — | — | — |
|  | B-4 | — | — | — | — | — | — | — | — | — | — | — |
| Powder (AB) | AB-1 | — | 97 | 97 | — | — | — | — | — | 97 | 97 | 97 |
| Powder (ABC) | ABC-1 | — | — | — | — | — | — | — | 100 | — | — | — |
| Powder (C) | C-1 | 3 | 3 | — | — | — | — | — | — | 3 | 3 | 3 |
|  | C-2 | — | — | — | — | — | — | — | — | — | — | — |
|  | C-3 | — | — | — | — | — | — | — | — | — | — | — |
|  | C-4 | — | — | 3 | — | — | — | — | — | — | — | — |
|  | C-5 | — | — | — | 1 | 20 | 0.5 | 25 | — | — | — | — |
| Binder solution 1 |  | — | 97 | 97 | — | — | — | — | — | — | 7 | — |
| Binder solution 2 |  | — | — | — | — | — | — | — | — | — | — | 7 |

With respect to the powder coating materials obtained in Ex. 1 to 22, the following evaluations were carried out. The results are shown in Tables 6 to 8. Tables 6 and 7 show evaluations of the powder coating materials of Examples of the present invention, and Table 8 shows evaluations of the powder coating materials of Comparative Examples.

(Hydrochloric Acid Resistance, Nitric Acid Resistance)

A 10% hydrochloric acid aqueous solution was prepared by ion-exchanged water and hydrochloric acid as a special grade reagent. Further, a 10% nitric acid aqueous solution was prepared by ion-exchanged water and nitric acid as a special grade reagent.

Then, each of the above hydrochloric acid aqueous solution and nitric acid aqueous solution was dropped by 5 mL every time on a coating film of the test specimen, then covered with a lid, and held for 4 hours, and then washed with water. Thereafter, the spot trace on the coating film was visually observed, and the hydrochloric acid resistance or the nitric acid resistance was evaluated by the following standards.

◯ (good): No change in the coating film is observed.
x (bad): Whitening or swelling is remarkable.

(Metallic Alignment)

Figure 2:
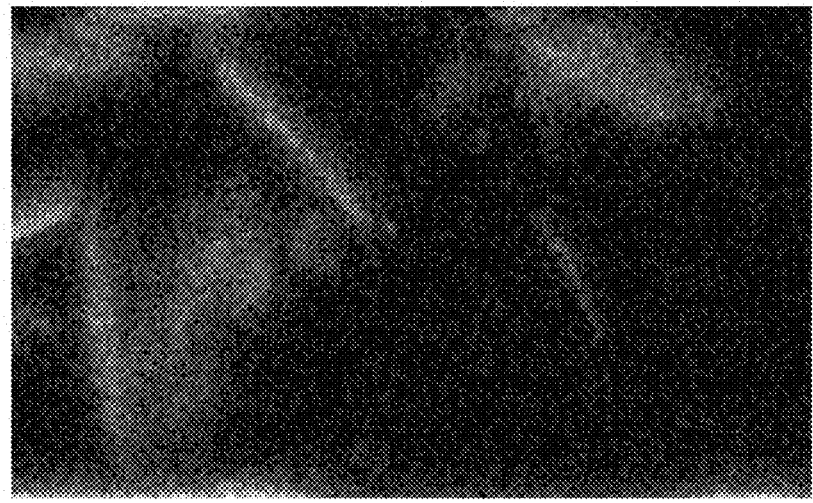
FIG. 2 is a scanning electron microscopic (SEM) image of a cross section of the coating film of the coated article obtained in Ex. 8.

The test specimen was cut, and the cross section of the coating film was observed by a microscope (Keyence Corporation) to evaluate whether or not there was disturbance in the alignment of the pigment (C) in the coating film. Further, the cross section of the coating film was also observed by a scanning electron microscope (ultrahigh resolution analytical scanning electron microscope SU-70, manufactured by Hitachi High-Technologies Corporation). The results were evaluated by the following standards. Further, scanning electron microscopic images of the cross sections of the coating films in Ex. 1 and Ex. 8 are shown in FIG. 1 and FIG. 2, respectively.

◯ (good): The metallic pigment is aligned parallel to the surface of a substrate (aluminum plate) at the interface of the two layers.
x (bad): There is a disturbance in the direction of alignment of the metallic pigment.

(Concealing Property)

A powder coating material was coated on black and white steel panels (manufactured by METOPAC PANELS Co.) for concealing power test, by the same procedure as in the above <Preparation of test specimen>, whereupon the L value on the white plate and the L value on the black plate were measured. From the results, the contrast ratio (%) was calculated by the L value on the black plate/the L value on the white plate×100. Color measurements were conducted by using a spectrophotometer SC-T manufactured by Suga Test Instruments Co., Ltd. From the results, the concealing property was evaluated by the following standards.

◯ (good): The contrast ratio is at least 90%.
x (bad): The contrast ratio is less than 90%.

(Color Unevenness)

With respect to the test specimen, color unevenness of a coating film was evaluated by visual observation based on the following standards.

◯ (good): The area where color unevenness is observed, is at most 20% to the total area of the test specimen.
Δ (normal): The area where color unevenness is observed, is more than 20% and less than 40% to the total area of the test specimen.
x (bad): The area where color unevenness is observed, is more than 40% to the total area of the test specimen.

(Accelerated Weather Resistance (Gloss Retention and Color Difference ΔE))

With respect to the test specimen, using an accelerated weathering tester in accordance with JIS B7753: 2007 (sunshine weatherometer meter system), an accelerated weather resistance test was carried out by setting the test time to be 3,000 hours. By taking the 60° specular gloss value of a coating film before the test as 100%, the retention (gloss retention) (%) of the 60° specular gloss value of the coating film after the test, was obtained. The 60° specular gloss value was measured by a gloss meter (micro-TRI-gross, manufactured by BYK Co., incident reflection angle 60°). Further, the color difference ΔE before and after the test was measured by a color difference meter (CR-300, manufactured by Minolta).

(Adhesion)

The coating film of the test specimen was cut with 1 mm spacing into tessellated 100 squares; an adhesive tape was adhered thereon; and then, the adhesive tape was peeled, whereby the adhesion of the coating film was evaluated by the following standards, from the number n (n/100) of the squares that were not peeled by the adhesive tape, among the 100 squares.

◯ (good): n is at least 90.
x (bad): n is at most 89.

TABLE 6

|  |  | Ex. 1 | Ex. 2 | Ex. 3 | Ex. 4 | Ex. 5 | Ex. 6 | Ex. 7 |
|---|---|---|---|---|---|---|---|---|
| SP value of resin | Fluororesin (A) | 18.4 | 18.4 | 17.8 | 17.8 | 17.8 | 18.4 | 17.6 |
|  | Pigment (C) | 21.8 | 19.2 | 18.2 | 19.2 | 18.4 | 21.8 | 21.0 |
|  | Resin (B) | 22.8 | 22.8 | 22.8 | 22.8 | 18.8 | 22.0 | 22.8 |
|  | SP (B-A) | 4.4 | 4.4 | 5.0 | 11.0 | 1.0 | 3.6 | 5.2 |
|  | SP (C-A) | 3.4 | 0.8 | 0.4 | 1.4 | 0.6 | 3.4 | 3.4 |
|  | SP (B-C) | 1 | 3.6 | 4.6 | 9.6 | 0.4 | 0.2 | 1.8 |
| Evaluation results | Hue (luster) of coating film | ◯ | ◯ | ◯ | ◯ | ◯ | ◯ | ◯ |
|  | Hydrochloric acid resistance | ◯ | ◯ | ◯ | ◯ | ◯ | ◯ | ◯ |
|  | Nitric acid resistance | ◯ | ◯ | ◯ | ◯ | ◯ | ◯ | ◯ |
|  | Metallic alignment | ◯ | ◯ | ◯ | ◯ | ◯ | ◯ | ◯ |
|  | Concealing property (%) | 98%<br>◯ | 92%<br>◯ | 90%<br>◯ | 91%<br>◯ | 90%<br>◯ | 92%<br>◯ | 94%<br>◯ |
|  | Accelerated weather resistance (gloss retention) | 89% | 90% | 88% | 87% | 87% | 81% | 82% |
|  | Accelerated weather resistance (color difference ΔE value) | 2.4 | 1.5 | 2.1 | 1.9 | 1.8 | 2.3 | 2.4 |
|  | Adhesion | 100/100<br>◯ | 100/100<br>◯ | 100/100<br>◯ | 100/100<br>◯ | 100/100<br>◯ | 100/100<br>◯ | 100/100<br>◯ |

TABLE 7

|  |  | Ex. 13 | Ex. 15 | Ex. 16 | Ex. 19 | Ex. 20 | Ex. 21 | Ex. 22 |
|---|---|---|---|---|---|---|---|---|
| SP value of resin | Fluororesin (A) | 18.4 | 18.4 | 18.4 | 18.4 | 18.4 | 18.4 | 18.4 |
|  | Pigment (C) | 21.8 | 21.0 | 21.0 | 18.8 | 21.8 | 21.8 | 21.8 |
|  | Resin (B) | 22.8 | 22.8 | 22.8 | 22.8 | 22.8 | 22.8 | 22.8 |
|  | SP (B-A) | 4.4 | 4.4 | 4.4 | 4.4 | 4.4 | 4.4 | 4.4 |
|  | SP (C-A) | 3.4 | 2.6 | 2.6 | 0.4 | 3.4 | 3.4 | 3.4 |
|  | SP (B-C) | 1.0 | 1.8 | 1.8 | 4.0 | 1.0 | 1.0 | 1.0 |

TABLE 7-continued

|  |  | Ex. 13 | Ex. 15 | Ex. 16 | Ex. 19 | Ex. 20 | Ex. 21 | Ex. 22 |
|---|---|---|---|---|---|---|---|---|
| Evaluation results | Hue (luster) of coating film | Δ | ○ | ○ | Δ | Δ | Δ | Δ |
|  | Hydrochloric acid resistance | ○ | ○ | ○ | ○ | ○ | ○ | ○ |
|  | Nitric acid resistance | ○ | ○ | ○ | ○ | ○ | ○ | ○ |
|  | Metallic alignment | ○ | ○ | ○ | ○ | ○ | ○ | ○ |
|  | Concealing property (%) | 91% | 90% | 97% | 90% | 94% | 92% | 91% |
|  |  | ○ | ○ | ○ | ○ | ○ | ○ | ○ |
|  | Accelerated weather resistance (gloss retention) | 81% | 81% | 83% | 82% | 85% | 83% | 88% |
|  | Accelerated weather resistance (color difference ΔE value) | 1.1 | 2.9 | 2.8 | 1.8 | 2.2 | 2.3 | 1.9 |
|  | Adhesion | 100/100 | 100/100 | 100/100 | 100/100 | 100/100 | 100/100 | 100/100 |
|  |  | ○ | ○ | ○ | ○ | ○ | ○ | ○ |

TABLE 8

|  |  | Ex. 8 | Ex. 9 | Ex. 10 | Ex. 11 | Ex. 12 | Ex. 14 | Ex. 17 | Ex. 18 |
|---|---|---|---|---|---|---|---|---|---|
| SP value of resin | Fluororesin (A) | 18.4 | 18.4 | 18.4 | 18.4 | — | 18.4 | 18.4 | 18.4 |
|  | Pigment (C) | 18.4 | 18.2 | 19.2 | 21.8 | 21.8 | 18.4 | 21 | 21 |
|  | Resin (B) | 22.8 | 22.8 | 18.8 | — | 22.8 | 22.8 | 22.8 | 22.8 |
|  | SP (B-A) | 4.4 | 4.4 | 0.4 | — | — | 4.4 | 4.4 | 4.4 |
|  | SP (C-A) | 0 | −0.2 | 0.8 | 3.4 | — | 0 | 2.6 | 2.6 |
|  | SP (B-C) | 4.4 | 4.6 | −0.4 | — | 2.4 | 4.4 | 1.8 | 1.8 |
| Evaluation results | Hue (luster) of coating film | X | X | X | X | X | X | X | ○ |
|  | Hydrochloric acid resistance | X | X | ○ | X | X | X | ○ | — |
|  | Nitric acid resistance | ○ | ○ | ○ | ○ | X | ○ | ○ | — |
|  | Metallic alignment | X | X | X | X | X | X | ○ | — |
|  | Concealing property (%) | 78% | 68% | 67% | 80% | 28% | 62% | 84% | — |
|  |  | X | X | X | X | X | X | X | — |
|  | Accelerated weather resistance (gloss retention) | 39% | 20% | 84% | 57% | 36% | 61% | 76% | — |
|  | Accelerated weather resistance (color difference ΔE value) | 4.5 | 6.6 | 2.2 | 5.2 | 3.8 | 3.8 | 3.3 | — |
|  | Adhesion | 100/100 | 100/100 | 0/100 | 0/100 | 10/100 | 0/100 | 100/100 | 0/100 |
|  |  | ○ | ○ | X | X | X | X | ○ | X |

As shown in the above results, the coating films in Ex. 1 to 7, 13, 15 to 16, 19 to 22, had no disturbance in the alignment direction of the metallic pigment and were excellent in the metallic hue and concealing property. Further, they were excellent also in acid resistance, weather resistance and adhesion to the substrate. Further, they had little color unevenness.

The coating films in Ex. 8 to 10 and 14 wherein the SP value of the covering material of the pigment (C) was at most the SP value of the fluororesin (A) or at least the SP value of the resin of (B), in Ex. 11 to 12 wherein either one of the fluororesin (A) and resin (B) was not contained, and in Ex. 17 wherein the content of the pigment (C) was less than 0.7 mass %, were inferior in the test results of at least one of the metallic hue, the concealing property and the weather resistance. Further, color unevenness was substantial. In the coating film in Ex. 18 wherein the content of the pigment (C) exceeded 23 mass %, bleeding-out was observed, whereby although no evaluation other than the hue and adhesion was carried out, the pigment (C) was exposed on the surface of the coating film, and the weather resistance would be low.

What is claimed is:

1. A powder coating material comprising a fluororesin (A), a resin (B) and a pigment (C), wherein a content of the pigment (C) to a total amount of the powder coating material is from 0.7 to 23 mass %, wherein:
    the fluororesin (A) has a fluorine content of at least 10 mass %;
    the resin (B) is at least one selected from the group consisting of a polyester resin and an acrylic resin, and has a SP value larger than a SP value of the fluororesin (A), and a difference between the SP value of the resin (B) and the SP value of the fluororesin (A) is at least 2.0 $(J/cm^3)^{1/2}$; and
    the pigment (C) is a metallic pigment covered with a covering material, the covering material is at least one selected from the group consisting of a phosphoric acid group-containing resin, an acrylic resin, a silicone resin, a polyethylene resin, an aliphatic compound, an aromatic compound, and a silane compound, and a SP value of the covering material is larger than the SP value of the fluororesin (A) by at least 0.2 $(J/cm^3)^{1/2}$ and smaller than the SP value of the resin (B) by at least 0.2 $(J/cm^3)^{1/2}$.

2. The powder coating material according to claim 1, wherein the powder coating material is made of a powder comprising: powder particles comprising the fluororesin (A) and the resin (B); and powder particles composed of the pigment (C).

3. The powder coating material according to claim 1, wherein the powder coating material is made of a powder comprising: powder particles comprising the fluororesin (A); powder particles comprising the resin (B); and powder particles composed of the pigment (C).

4. The powder coating material according to claim 1, wherein the fluororesin (A) is a polyvinylidene fluoride.

5. The powder coating material according to claim 1, wherein the fluororesin (A) is a fluororesin having hydroxy groups or carboxy groups.

6. The powder coating material according to claim 5, wherein the powder coating material comprises powder particles comprising: the fluororesin (A); and a curing agent.

7. The powder coating material according to claim 1, wherein the resin (B) is a fluororesin having a fluorine content of less than 10 mass %, or a resin having no fluorine atom.

8. The powder coating material according to claim 1, wherein the powder coating material comprises powder particles comprising: the resin (B); and a curing agent.

9. The powder coating material according to claim 1, wherein the pigment (C) is composed of scaly aluminum particles covered with the covering material.

10. The powder coating material according to claim 1, wherein the difference between the SP value of the resin (B) and the SP value of the fluororesin (A) is from 2.0 to 12 $(J/cm^3)^{1/2}$.

11. The powder coating material according to claim 1, wherein the SP value of the covering material is larger than the SP value of the fluororesin (A) by at least 0.4 $(J/cm^3)^{1/2}$ and smaller than the SP value of the resin (B) by at least 0.4 $(J/cm^3)^{1/2}$.

12. The powder coating material according to claim 1, wherein the SP value of the covering material is larger than the SP value of the fluororesin (A) by at least 0.6 $(J/cm^3)^{1/2}$ and smaller than the SP value of the resin (B) by at least 0.6 $(J/cm^3)^{1/2}$.

13. A coated article comprising:
a substrate; and
a coating film provided on a surface of the substrate and formed from the powder coating material as defined in claim 1.

14. A method for producing a coated article, the method comprising:
applying the powder coating material as defined in claim 1 to a substrate to form a film of a powder;
heating the film of the powder to form a film made of a melt of the powder; and
cooling the film made of the melt to form a coating film.

* * * * *